(12) United States Patent
Spruell

(10) Patent No.: US 9,928,936 B2
(45) Date of Patent: *Mar. 27, 2018

(54) VIBRATION RESISTANT CABLE

(71) Applicant: Southwire Company, LLC, Carrollton, GA (US)

(72) Inventor: Stephen Lee Spruell, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,247

(22) Filed: May 11, 2017

(65) Prior Publication Data

US 2017/0243671 A1 Aug. 24, 2017

Related U.S. Application Data

(63) Continuation of application No. 14/956,528, filed on Dec. 2, 2015, now Pat. No. 9,660,431, which is a continuation of application No. 14/097,301, filed on Dec. 5, 2013, now Pat. No. 9,225,157, which is a continuation of application No. 13/245,150, filed on Sep. 26, 2011, now Pat. No. 8,624,110, which is a continuation of application No. 12/885,604, filed on Sep. 20, 2010, now abandoned, which is a continuation of application No. 12/177,945, filed on Jul. 23, 2008, now Pat. No. 7,807,922.

(60) Provisional application No. 61/061,168, filed on Jun. 13, 2008, provisional application No. 61/022,630, (Continued)

(51) Int. Cl.
*H01B 5/00* (2006.01)
*H02G 7/14* (2006.01)
*H01B 1/02* (2006.01)
*H01B 5/10* (2006.01)

(52) U.S. Cl.
CPC ............... *H01B 5/006* (2013.01); *H01B 1/02* (2013.01); *H01B 5/104* (2013.01); *H02G 7/14* (2013.01)

(58) Field of Classification Search
USPC .................................. 174/27, 34, 36, 102 R
See application file for complete search history.

(56) References Cited

U.S. PATENT DOCUMENTS

| 863,969 A | 8/1907 | Dieselhorst et al. |
| 2,321,021 A * | 6/1943 | Dyer, Jr. ................ H01B 5/104 174/128.1 |
| 2,583,025 A | 1/1952 | Swift et al. |

(Continued)

FOREIGN PATENT DOCUMENTS

WO    WO 85/01839    4/1985

OTHER PUBLICATIONS

"Standard Specification for ACSR Twisted Pair Conductor (ACSR/TIP)[1]," ASTM International, Designation: B 911/B911M—05, pp. 398-400 (Author & date unknown).

(Continued)

*Primary Examiner* — William H Mayo, III
(74) *Attorney, Agent, or Firm* — Merchant & Gould P.C.

(57) ABSTRACT

Vibration resistant cables containing a first conductor and a second conductor, each having a diameter d, are disclosed. The second conductor is twisted around the first conductor at a lay length between 3 feet and 6 feet to eliminate bagging of the vibration resistant cable during installation.

18 Claims, 29 Drawing Sheets

3 FT LAY CABLE

Related U.S. Application Data filed on Jan. 22, 2008, provisional application No. 60/952,692, filed on Jul. 30, 2007.

(56) References Cited

U.S. PATENT DOCUMENTS

| | | | |
|---|---|---|---|
| 2,583,026 A | | 1/1952 | Swift |
| 3,388,208 A | | 6/1968 | Liberman et al. |
| 3,659,038 A | | 4/1972 | Shealy |
| 3,676,578 A | | 7/1972 | Cahill |
| 3,778,527 A | | 12/1973 | Nigol |
| 3,904,811 A | | 9/1975 | Otsuki et al. |
| 3,916,083 A | | 10/1975 | Yakovlev et al. |
| 3,991,550 A | * | 11/1976 | Cohen .................... D07B 5/005 174/42 |
| 3,992,566 A | | 11/1976 | Kerimov et al. |
| 4,408,444 A | | 10/1983 | Baillievier |
| 4,549,035 A | | 10/1985 | Zaltsberg |
| 4,554,402 A | | 11/1985 | Hawkins et al. |
| 4,620,059 A | * | 10/1986 | Sherman .................. H02G 7/14 174/42 |
| 4,663,496 A | | 5/1987 | Peek, Jr. |
| 4,777,327 A | | 10/1988 | Richardson, Jr. |
| 4,980,517 A | | 12/1990 | Cardas |
| 5,146,982 A | | 9/1992 | Dinkins |
| 5,171,942 A | | 12/1992 | Powers |
| 5,214,244 A | * | 5/1993 | Cummings ............ H01B 7/145 114/243 |
| 5,767,441 A | | 6/1998 | Brorein et al. |
| 5,990,419 A | | 11/1999 | Bogese, II |
| 6,353,177 B1 | | 3/2002 | Young |
| 7,375,284 B2 | | 5/2008 | Stutzman et al. |
| 7,462,782 B2 | | 12/2008 | Clark |
| 7,807,922 B2 | * | 10/2010 | Spruell .................... H01B 5/08 174/112 |
| 8,624,110 B2 | | 1/2014 | Spruell |
| 9,225,157 B2 | | 12/2015 | Spruell |
| 9,660,431 B2 | | 5/2017 | Spruell |
| 2009/0071677 A1 | | 3/2009 | Spruell |
| 2010/0038112 A1 | | 2/2010 | Grether |
| 2011/0114367 A1 | | 5/2011 | Spruell |
| 2012/0061121 A2 | | 3/2012 | Spruell |
| 2012/0103656 A1 | | 5/2012 | Spruell |

OTHER PUBLICATIONS

Thrash, Jr., entitled "*Transmission Conductors—A review of the design and selection criteria*," by Southwire Communications, Jan. 31, 2003, Wire & cable Technology Group, 11 pages.

"*Twisted Pair (TP) Conductor*," American Wire Group, Inc., Apr. 8, 2011, 3 pages.

VR Cable, Vibration-Resistant, Bare Aluminum Cable, Available in AAC and ACSR Constructions, Southwire, May 12, 2006, 1 page.

Shigley, Joseph, entitled "*Design of Mechanical Elements*," Mechanical Engineering Design, $5^{th}$ Edition, p. 414.

RUS Bulletin 1724E-200, Design Manual for High Voltage Transmission Lines, Electric Staff Division, Rural Utilities Service, U.S. Department of Agriculture, May 2005, 314 pages.

International Search Report dated Dec. 23, 2008 cited in Application No. PCT/US2008/070885.

J.B. Roche et al., entitled "*T2 Wind Motion Resistant Conductor*," IEEE Transactions on Power Apparatus and Systems, vol. PAS-104, No. 10, Oct. 1985, pp. 2879-2887.

U.S. Ex Parte Reexamination Office Action dated Jan. 12, 2012 cited in U.S. Appl. No. 90/011,757, 32 pages.

U.S. Ex Parte Reexamination Final Office Action dated Mar. 23, 2012 cited in U.S. Appl. No. 90/011,757, 32 pages.

U.S. Ex Parte Reexamination Advisory Action dated Jun. 6, 2012 cited in U.S. Appl. No. 90/011,757, 2 pages.

U.S. Ex Parte Reexamination Notice of Intent to Issue Certificate dated Sep. 17, 2012 cited in U.S. Appl. No. 90/011,757, 6 pages.

U.S. Office Action dated Feb. 23, 2012 cited in U.S. Appl. No. 12/885,604, 23 pages.

U.S. Final Office Action dated Dec. 17, 2012 cited in U.S. Appl. No. 12/885,604, 16 pages.

U.S. Office Action dated Feb. 28, 2012 cited in U.S. Appl. No. 13/245,150, 15 pages.

U.S. Final Office Action dated Aug. 22, 2012 cited in U.S. Appl. No. 13/245,150, 20 pages.

U.S. Office Action dated Feb. 22, 2013 cited in U.S. Appl. No. 13/245,150, 17 pages.

\* cited by examiner

3 FT LAY CABLE

9 FT LAY CABLE

6 FT AND 3 FT COMBINATION LAY CABLE

OVERALL MESH

CLOSE-UP OF CABLE AND MESH

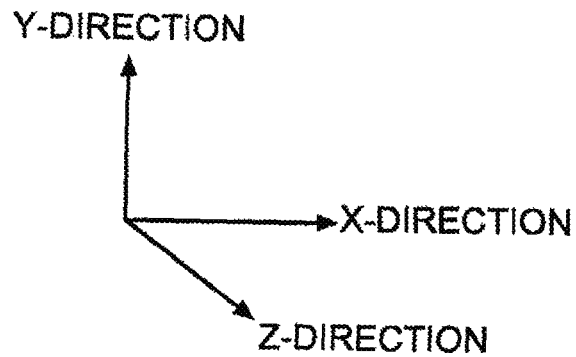
FIG. 6A
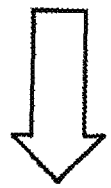
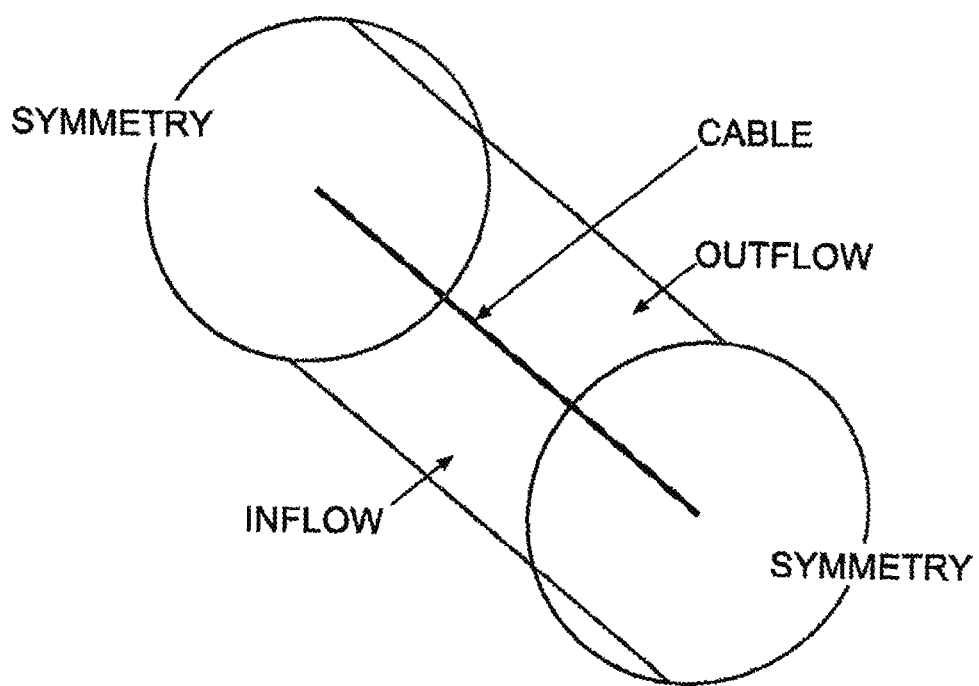
FIG. 6B

VELOCITY (m/s) ON PLANE 2 AT VARIOUS TIME-INSTANTS INDICATING THE TIME-DEPENDANT NATURE OF FLOW BEHAVIOR

PRESSURE (Pa) ON PLANE 2 AT VARIOUS TIME-INSTANTS
INDICATING THE TIME-DEPENDANT NATURE OF FLOW BEHAVIOR

VELOCITY AT VARIOUS TIMES: 9FT LAY CABLE

VELOCITY (m/s) ON PLANE 2 AT VARIOUS TIME-INSTANTS INDICATING
THE CHAOTIC AND TIME-DEPENDANT NATURE OF THE FLOW BEHAVIOR

PRESSURE (Pa) ON PLANE 2 AT VARIOUS TIME-INSTANTS INDICATING THE CHAOTIC AND TIME-DEPENDANT NATURE OF THE FLOW BEHAVIOR

VELOCITY AT VARIOUS TIMES: 6FT-3FT COMBINATION LAY CABLE

VELOCITY (m/s) ON PLANE 2 AT VARIOUS TIME-INSTANTS INDICATING THE TIME-DEPENDANT NATURE OF THE FLOW BEHAVIOR

PRESSURE (Pa) ON PLANE 2 AT VARIOUS TIME-INSTANTS INDICATING THE TIME-DEPENDANT AND CHAOTIC NATURE OF THE FLOW BEHAVIOR

FORCES ON THE 6FT-3FT COMBINATION LAY CABLE

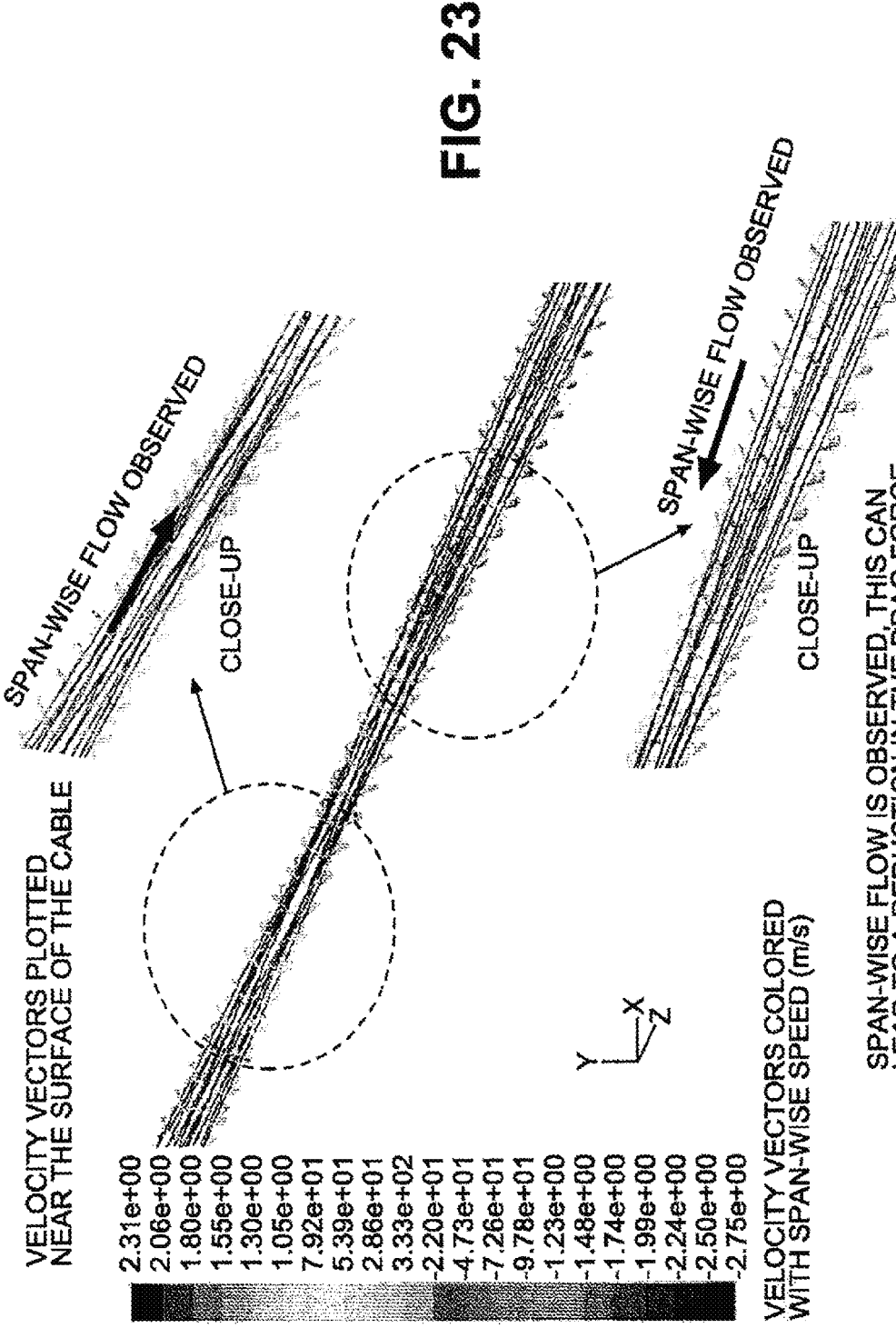

EXAMINATION OF DETAILED FLOW BEHAVIOR (1 FT LAY CABLE)

PRESSURE (Pa) ON MID-SPAN PLANE

THE DRAG FORCE ON 3 FT SECTION OF 1 FT LAY LENGTH CABLE IS 0.63N; THIS FORCE IS SCALED TO OBTAIN THE DRAG FORCE ON A 9 FT CABLE. THE FORCE ON A 9 FT LONG, 1 FT LAY LENGTH CABLE IS (3* .63) 1.89N. THE LIFT FORCE AND MOMENT ON THE CABLE ARE NEGLIGIBLE

VIBRATION RESISTANT CABLE

REFERENCE TO RELATED APPLICATIONS

This application is a continuation application of U.S. patent application Ser. No. 14/956,528, filed on Dec. 2, 2015, now U.S. Pat. No. 9,660,431, which is a continuation application of U.S. patent application Ser. No. 14/097,301, filed on Dec. 5, 2013, now U.S. Pat. No. 9,225,157, which is a continuation application of U.S. patent application Ser. No. 13/245,150, filed on Sep. 26, 2011, now U.S. Pat. No. 8,624,110, which is a continuation application of U.S. patent application Ser. No. 12/885,604, filed on Sep. 20, 2010, now abandoned, which is a continuation application of U.S. patent application Ser. No. 12/177,945, filed on Jul. 23, 2008, now U.S. Pat. No. 7,807,922, which claims the benefit of U.S. Provisional Application No. 60/952,692, filed on Jul. 30, 2007, U.S. Provisional Application No. 61/022,630, filed on Jan. 22, 2008, and U.S. Provisional Application No. 61/061,168, filed on Jun. 13, 2008, all of which are incorporated herein by reference in their entirety.

COPYRIGHTS

All rights, including copyrights, in the material included herein are vested in and the property of the Applicant. The Applicant retains and reserve all rights in the material included herein, and grant permission to reproduce the material only in connection with reproduction of the granted patent and for no other purpose.

BACKGROUND

Electrical energy is transmitted using power lines. Power lines include electrical conductors configured to conduct the electrical energy. The electrical conductors are supported or suspended from power line structures similar to a power line structure 100 as described below with respect to FIG. 1A. Because power lines are exposed to meteorological elements, power lines may be designed and constructed to withstand potential damages that may be caused by vibrations due to meteorological elements such as wind and/or ice, for example. Due to meteorological elements, a number of undesirable vibration phenomenon may occur, for example, "aeolian" vibration (e.g. torsional conductor movement and string vibration) which can lead to conductor fatigue failures and conductor "galloping." These undesirable vibration phenomenon may result in: i) contact between multiple conductors or between multiple conductors and overhead ground wires (i.e. shields); ii) conductor failure at support points on power line structures due to vibration induced stress; iii) possible power line structure damage; and iv) excessive conductor sag due to conductor overstressing.

Aeolian vibration is a high-frequency low-amplitude oscillation generated by a low velocity, comparatively steady wind blowing across a conductor. This steady wind creates air vortices or eddies on the lee side of the conductor. These vortices or eddies will detach at regular intervals from the top and bottom area of the conductor (i.e. "vortex shedding") creating a force on the conductor that is alternately impressed from above and below. If the frequency of the forces (i.e. expected excitation frequency) approximately corresponds to a frequency of a resonant vibration mode for a conductor span (i.e. natural frequency of the power line), the conductor will tend to vibrate in many loops in a vertical plane. The frequency of resonant vibration depends mainly on conductor size and wind velocity and is generally between 5 and 100 Hz for wind speeds within the range of 0 to 15 miles per hour. The peak-to-peak vibration amplitudes will cause alternating bending stresses great enough to produce fatigue failure in the conductor strands at the attachment points to the power line structure. Highly tensioned conductors in long spans are particularly subject to vibration fatigue. This vibration is generally more severe in flat open terrain where steady winds are more often encountered.

Conductor galloping (sometimes called dancing), is a phenomenon where power line conductors move or vibrate with large amplitudes. Galloping usually occurs when an unsteady, high or gusty wind blows over a conductor covered by a layer of ice deposited by freezing rain, mist, or sleet. The coating may vary from a very thin glaze on one side to a solid three-inch cover giving the conductor an irregularly shaped profile. Consequently, this ice covering may give the conductor a slightly out-of-round, elliptical, or quasi-airfoil shape. Wind blowing over this irregularly shaped profile results in aerodynamic lift that causes the conductor to gallop. The wind can be anything between 5 to 45 miles-per-hour at an angle to the power line of 10 to 90 degrees. The wind may be unsteady in velocity or direction.

During galloping, conductors oscillate elliptically at frequencies on the order of 1-Hz or less with vertical amplitudes of several feet. Sometimes two loops appear, superimposed on one basic loop. Single-loop galloping rarely occurs in spans over 600 to 700 feet. This is fortunate because it would be impractical to provide clearances large enough in long spans to prevent the possibility of contact between phases. In double-loop galloping, the maximum amplitude usually occurs at the quarter span points and is smaller than that resulting from single-loop galloping. There are several measures that can be incorporated at the power line's design stage to reduce potential conductor contacts caused by galloping, such as designing the power line to have shorter spans, or increased phase separation.

In areas where galloping is either historically known to occur or is expected, power line designers should indicate design measures that will minimize galloping and galloping problems, especially conductor contacts. The primary tool for assuring absence of conductor contacts is to superimpose Lissajous ellipses over a structure's scaled diagram to indicate a galloping conductor's theoretical path. FIG. 1A shows power line structure 100, a first phase Lissajous ellipse 105, a second phase Lissajous ellipse 110, a third phase Lissajous ellipse 115, a first shield Lissajous ellipse 120, and a second shield Lissajous ellipse 125. Ways to calculate the aforementioned Lissajous ellipses is shown in Table 1 and FIG. 1B.

TABLE 1

| | Single Loop | | Double Loop | |
|---|---|---|---|---|
| Major Axis 'M' | $M = 1.25 S_i + 1.0$ | Eq. 6-7 | $M = 1.0 + \sqrt{\dfrac{3a\left(L + \dfrac{8S_i^3}{3L} - 2a\right)}{8}}$ where $a = \sqrt{\left(\dfrac{L}{2}\right)^2 + S_i^2}$ | Eq. 6-8 |
| Distance 'B' | $B = 0.25 S_i$ | Eq. 6-9 | $B = 0.2M$ | Eq. 6-10 |

TABLE 1-continued

| | Single Loop | | Double Loop | |
|---|---|---|---|---|
| Minor Axis 'D' | $D = 0.4M$ | Eq. 6-11 | $D = 2\sqrt{M-1.0}$ | Eq. 6-12 |

Where:
$p_c$ = wind load per unit length on iced conducter in lbs/ft. Assume a 2 psf wind.
$w_c$ = weight per unit length of conductor plus 1/2 in. of radial ice, lbs/ft
L = span length in feet.
M = major axis of Lissajous ellipses in feet.
$S_f$ = final sag of conductor with 1/2 in. of radial ice, no wind, at 32° F., in feet.
D = minor axis of Lissajous ellipses in feet.
B, Ø = as defined in FIGURE above To avoid contact between phase conductors or between phase conductors and shield wires, none of the ellipses (i.e. first phase Lissajous ellipse 105, second phase Lissajous ellipse 110, third phase Lissajous ellipse 115, first shield Lissajous ellipse 120, and second shield Lissajous ellipse 125) should touch one another. However, if galloping is expected to be infrequent and of minimal severity, there may be situations where allowing ellipses to overlap may be the favored design choice when economics are considered.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A vibration resistant cable may be provided. The vibration resistant cable may comprise a first conductor and a second conductor. The second conductor may be twisted around the first conductor at a lay length configured to cause a locking force between the first conductor and the second conductor. The locking force may be configured to prevent relative movement of the first conductor and the second conductor that may result in bags in the vibration resistant cable.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 6A is a key for the directions;

FIG. 6B shows the directions of the simulated unsteady flow behavior of air at 25 mph over the VR cable;

FIG. 23 shows the detailed examination for the 9 ft. lay VR cable (e.g. FIG. 4B);

FIG. 4A.);

DETAILED DESCRIPTION

Figure 1A:
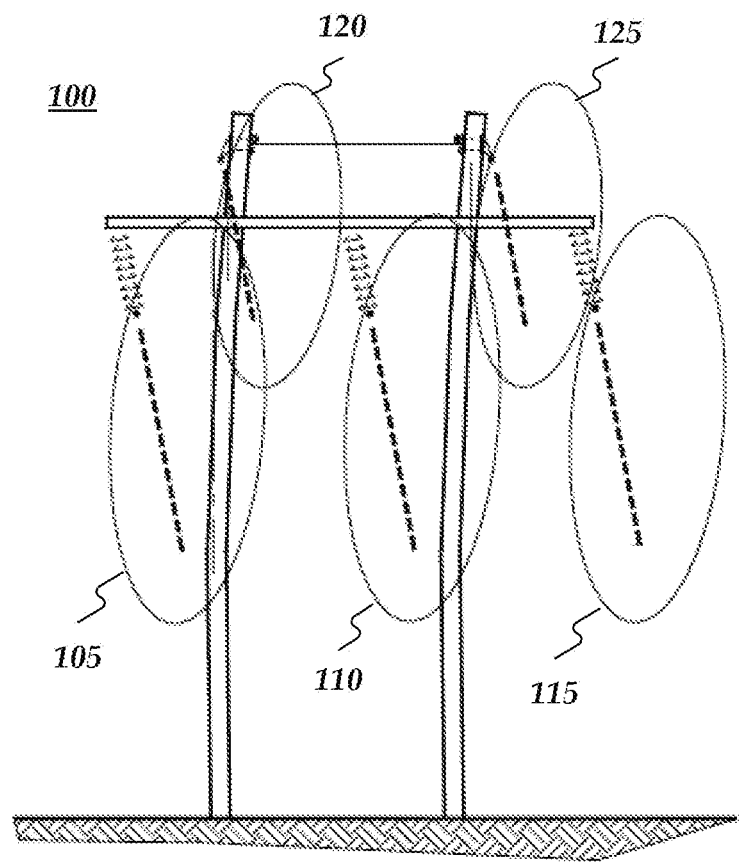
FIG. 1A is a diagram illustrating conductor galloping.
Figure 1B:
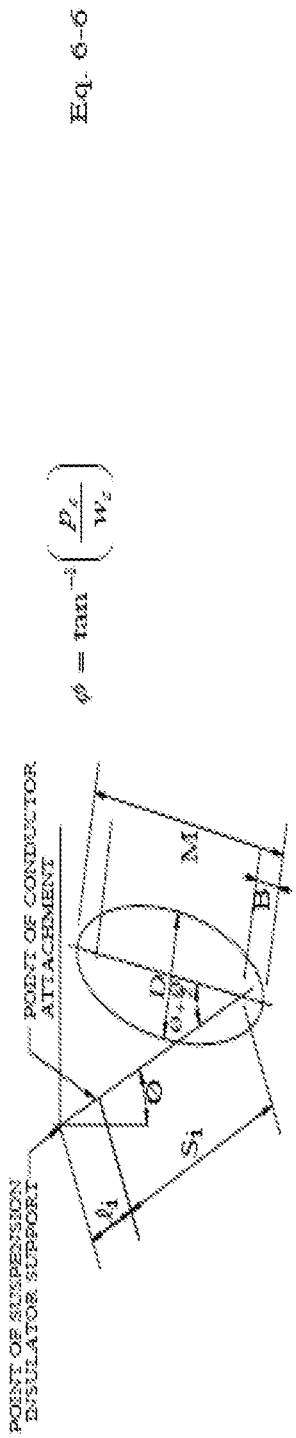
FIG. 1B is a diagram illustrating ways to calculate Lissajous ellipses.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

A vibration resistant (VR) cable may be provided. Consistent with embodiments of the invention, the VR cable may comprise a first conductor twisted around a second conductor at a predetermined or varying lay length. Consequently, embodiments of the invention may provide a changing profile to wind due to the VR cable's twisting nature that may prevent excitation in a vibration mode with or without ice buildup when the VR cable is used in a power line. Embodiments of the invention may change the twisting angle and or lay length of the two conductors such that more twists occur in a given length than in conventional systems. In other words, embodiments of the invention may have shorter lay lengths than conventional systems. Computational Fluid Dynamics may be used as a tool to demonstrate embodiments consistent with the invention.

In conventional systems, long lay lengths cause unwanted relative movement of the two conductors during manufacturing or installation that create "bags" (e.g. "loops") in the cable. These bags cause conductors comprising the cable not to stay together as one profile and are thus undesirable. These bags may occur during construction of a power line using the cable, after the power line using the cable is constructed, or even during manufacture of the cable. In addition, it is time consuming and expensive to correct these conditions after they occur. Consistent with embodiments of the invention, shorter lay lengths may help hold conductors together better in the VR cable. Moreover, the shorter lay lengths may aid in manufacturing and installation by preventing unwanted relative movement of the two conductors during manufacturing or installation that create bags.

Furthermore, the lay length may be chosen (e.g. when applied in a power line) to set the VR cable's natural frequency to lessen or avoid galloping modes and aeolian vibration modes (i.e. torsional modes and "string" type vibration modes.) Embodiment of the invention may provide power lines with natural frequencies that may be less likely to be excited by, for example, wind blowing across the power lines' cables. This may be true in conditions when the cable is covered with ice and when it is not. Consistent with embodiments of the invention, cables having shorter lay lengths or a lay lengths that may vary may be a less "excitable" by winds having a frequency and speeds expected to blow on the cable. Moreover, a tighter lay length (i.e. more twists per unit length) may change the stiffness and damping of the VR cable to dampen vibrations that may develop before the vibrations produce damage to the VR cable.

Figure 2:
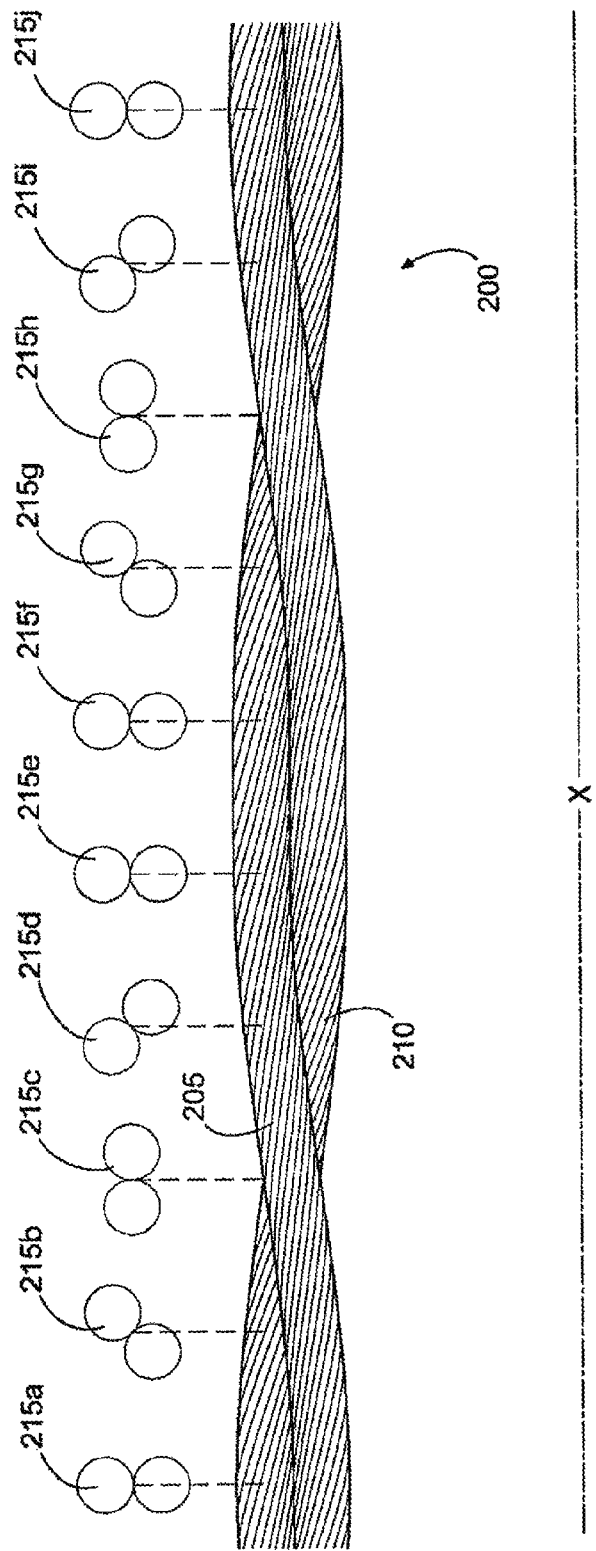
FIG. 2 is a diagram showing a vibration resistant cable.

FIG. 2 shows a VR cable 200 consistent with embodiments of the invention. As shown in FIG. 2, VR cable 200 may comprise a first conductor 205 and a second conductor 210 twisted around one another. Cable 200 may have a lay length X. Lay length X may be constant over a unit length of VR cable 200 or may vary over a unit length of VR cable 200. For example, lay length X may vary at a constant rate between two feet and four feet for every fifty feet of VR cable 200. Moreover, lay length X may vary at a non-constant rate. Elements 215a through 215j show cross sections of VR cable 200 at their respective corresponding locations. For example, between elements 215c and 215h, one twist of VR cable 200 corresponding to lay length X may occur. VR cable 200 may be used in any power line. RUS BULLETIN 1724E-200, "DESIGN MANUAL FOR HIGH VOLTAGE TRANSMISSION LINES", published by the Electric Staff Division, Rural Utilities Service, U.S. Department of Agriculture shows how power lines may be designed and is incorporated herein by reference.

Lay length X may be configured to cause a power line using VR cable 200 to have a natural frequency not equal to an expected excitation frequency for an environment in which the power line is constructed. Moreover, the natural frequency may not only be unequal to the expected excitation frequency, but the natural frequency may be made sufficiently different than the expected excitation frequency by a predetermined value. In other words, the difference between the natural frequency and the expected excitation frequency may be different by a value that may be predetermined. Furthermore, a power line using VR cable 200 with lay length X may be determined to have a natural frequency range. Likewise, the expected excitation frequency for the environment in which the power line is constructed may have a range. Consistent with embodiments of the invention, lay length X may have a value configured to cause the aforementioned natural frequency range and the aforementioned expected excitation frequency range to not overlap or to have a buffer frequency range between the aforementioned natural frequency range and the aforementioned expected excitation frequency range.

For example, a frequency of a resonant vibration mode for a span in the power line may comprise the natural frequency. The natural frequency may depend on conductor size (e.g. diameter, weight, ect.) and wind velocity and is generally between 5 and 100 Hz for wind speeds within the range of 0 to 15 miles per hour. The expected excitation frequency may comprise the frequency of the forces (e.g. wind) acting upon the power line. Consistent with embodiments of the invention, lay length X may be constant over a unit length of VR cable 200 or may vary over a unit length of VR cable 200. Lay length X may be selected to cause the power line to have a natural frequency not equal to the expected excitation frequency for the environment in which the power line is constructed. In this way, because the natural frequency may not be equal to the expected excitation frequency, wind corresponding to the expected excitation frequency may: i) not be able to cause a vibration phenomenon in VR cable 200 used in the power line or ii) may only cause a minimal vibration phenomenon in VR cable 200 that may not damage the power line.

In addition, lay length X may be configured to cause a power line using VR cable 200 to provide a dampening effect to the power line using VR cable 200 to vibration phenomenon caused at the expected excitation frequency for an environment in which the power line is constructed. Consistent with embodiments of the invention, lay length X may be selected to cause VR cable 200 to be less "excitable" by winds having a frequency and speeds expected to blow on VR cable 200 used in the power line. In other words, "excitation characteristics" for VR cable 200 may be selected in such a way that energy from wind may be dampened even when the natural frequency range for the power line may overlap the expected excitation frequency range of the power line's expected environment. The excitation characteristics may be selected to cause the aforementioned dampening effect by selecting a particular lay length X or by varying the lay length over a unit length of VR cable 200. For example, lay length X may be selected to increase damping in VR cable 200 to dampen vibrations that may develop before the vibrations produce damage to VR cable 200 used in the power line.

Consistent with embodiments of the invention, the lay length may be optimized. For example, the lay length may be optimized in order to have a range in a level of tightness between first conductor 205 and second conductor 210. For example, if first conductor 205 and second conductor 210 are twisted around one another too loosely, relative movement between first conductor 205 and second conductor 210 may be so great that bags may occur in cable 200. However, if first conductor 205 and second conductor 210 are twisted around one another too tightly, relative movement between first conductor 205 and second conductor 210 may be so minimized that the aeolian vibration dampening effect in cable 200 may be minimized to an undesirable level.

Consistent with embodiments of the invention, causing the power line using the vibration resistant cable to have a natural frequency not equal to an expected excitation frequency for an environment in which the power line is constructed may occur when the power line is constructed to the minimum design conditions associated with the National Electric Safety Code (NESC) standards. (See TABLE 2.) Furthermore the aforementioned bagging elimination and dampening effect for vibration phenomenon may occur with the power lines built to National Electric Safety Code (NESC) standards. Notwithstanding, the aforementioned desired attributes may occur with power lines constructed to any standard and is not limited to the NESC.

TABLE 2

NESC LOADING DISTRICTS

| District | Design Temp. (F°) | Radial ice Thickness (inches) | Wind Pressure (psf) | Constants (lbs/ft) |
|---|---|---|---|---|
| Heavy Loading | 0° | 0.5 | 4 | 0.30 |
| Medium Loading | 15° | 0.25 | 4 | 0.20 |
| Light Loading | 30° | 0 | 9 | 0.05 |

In cable 200 first conductor 205 and second conductor 210 may be viewed as two coil springs that may be right beside each other. As cable 200 is strung in the air between power line structures, sheaves holding cable 200 at the power line structures may have a tendency to grab one of the conductors (e.g. first conductor 205 or second conductor 210.) Because of friction between first conductor 205 and or second conductor 210 and the stringing sheaves, there is push back. If first conductor 205 and second conductor 210 are tight enough together as cable 200 tries to push back with a compressive, spring force, this force pushes back and prevents bagging. If may be assumed that friction between first conductor 205 and second conductor 210 may be minimal (e.g. the conductors may be lubricated.)

The following equations show the relationship between first conductor 205 and second conductor 210 in cable 200:

$$K = \frac{d^4 G}{8 D^3 N} \quad (1)$$

Where:

K is the spring rate d is the diameter of the individual conductors

D is the distance between the two conductors

G is the modules of rigidity (a property like modulus of elasticity)

N is the number of coils engaged or active coils

In the case that D and d are equal:

$$K = \frac{dG}{8N} \quad (2)$$

Because (N)(LAY)=SPRING LENGTH, $$N = \frac{\text{SPRING LENGTH}}{\text{LAY}} \quad (3)$$

Substituting (3) into (2)

$$K = \frac{(d)(G)\,(\text{LAY})}{(8)\,(\text{SPRING LENGTH})} \quad (4)$$

Locking force=(K) (deflection), then $$\text{Locking force} = \frac{(d)(G)\,(\text{LAY})\,(\text{deflection})}{(8)\,(\text{SPRING LENGTH})}$$

for a cable with conductor diameter=$d_1$, Locking force is $$\text{for } d = d_1, \text{ Locking force} = \frac{(d_1)(G)\,(\text{LAY}_1)\,(\text{deflection})}{(8)\,(\text{Spring Length})}$$
$$\text{Lay} = \text{Lay}_1$$

for a cable with conductor diameter=$d_2$, Locking force is $$\text{for } d = d_2, \text{ Locking force} = \frac{(d_2)(G)\,(\text{LAY}_2)\,(\text{deflection})}{(8)\,(\text{Spring Length})}$$
$$\text{Lay} = \text{Lay}_2$$

For the same locking force for cable constructions with $d_1$ and $d_2$. Two different cables:

$$\frac{d_1 G \; \text{Lay}_1 \; \text{deflection}}{8 \; \text{Spring Length}} = \frac{d_2 G \; \text{Lay}_2 \; \text{deflection}}{8 \; \text{Spring Length}} \quad (5)$$

Now, setting (spring lengths) and (deflections) same for both cables, equation (5) reduces to:

$$\frac{\text{Lay 1}}{\text{Lay 2}} = \frac{d_2}{d_1}$$

As shown above, the change in "lay" to achieve the same locking force with the same deflection within the same active length of cable may be linear with the change in diameter "d". This analysis neglects friction in the model and assumes well lubricated conductors. Consequently, lay length changing with diameter of individual conductor element can create a "locking force" to prevent relative conductor sliding or movement. Movement prevention may stop bags or loops from forming while, for example, making, installing, or using cable 200. A linear relationship based on the above formulas to describe the optimal lay of the cable which may prevent bags or loops, may be given as:

Lay=$c_1 d + c_2$, where d is the conductor diameter and $c_1$ and $c_2$ are constants that can be chosen to achieve the desired locking effect while still providing enough relative movement in the cable for effective Aeolian vibration dampening.

As described above, the locking force may minimize or prevent conductor movement as described by the above equations that relate to, for example, compression springs. Because first conductor 205 and second conductor 210 become more spring-like the shorter the lay length becomes, the spring forces in first conductor 205 and second conductor 210 tend to prevent relative movement of first conductor 205 and second conductor 210. In other words, the shorter the lay length becomes, the more resistant first conductor 205 and second conductor 210 becomes to being either stretched or compressed. For example, the lay length of VR cable 200 may be configured to cause a locking force between first conductor 205 and second conductor 210 configured to prevent relative movement of first conductor 205 and second conductor 210 that would result in bags in VR cable 200 if the lay length were of a conventional length. The lay length may be further configured to reduce a drag force when wind blows across VR cable 200 when a component of the wind, for example, is in a perpendicular direction to an axis of VR cable 200. For example, the drag force may be reduced by 2% to 3%.

FIG. 3A through FIG. 28 illustrate an operational example of cable 200 that may show the effect of lay length on the stability of cable 200 consistent with embodiments of the present invention. This operational example compares shorter lay VR cables or varying lay VR cables to conventional long lay cable. Consistent with embodiments of the invention, a reduction in drag coefficient with shorter lay lengths may be obtained as compared to conventional long lay cables. Consequently, consistent with embodiments of the invention, energy transferred into cable 200 may be reduced, which may reduce the likelihood of galloping or vibration, for example. The same results may be applicable to iced cables as well.

Figure 3A:
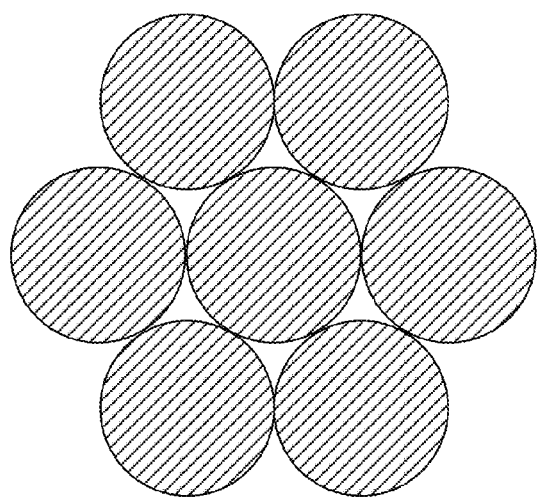
FIG. 3A illustrates a "swallow" VR cable.
Figure 3B:
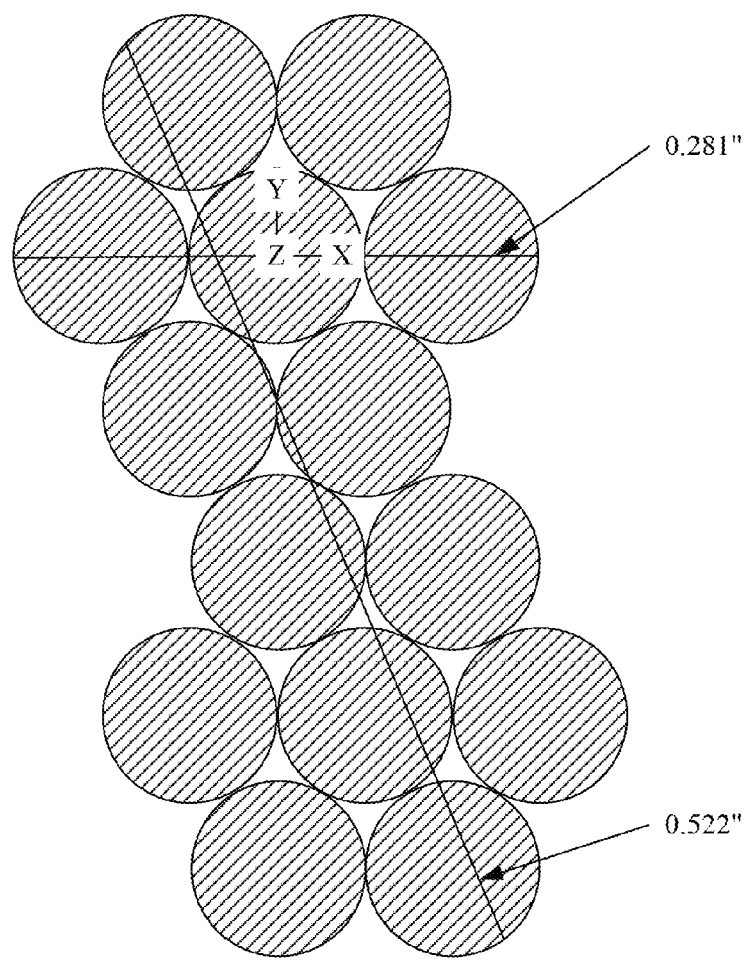
FIG. 3B, shows a VR cable comprising two individual conductors twisted together.

As illustrated in FIG. 3A through FIG. 28, cables of varying lay lengths may be analyzed using Computational Fluid Dynamics (CFD) processes. Lift, drag, and moment on cables of fixed overall length (9 ft), but varying lay lengths may be examined. Vortex shedding behavior is also examined. Also, the effect of lay on the aerodynamic behavior of the cables is assessed. FIGS. 3A and 3B illustrate a "swallow" VR cable. As shown in FIG. 3B, the cable comprises two individual conductors twisted together. Each individual conductors comprises of a total of seven strands, six 0.0937" Al strands and one 0.0937" steel strand (i.e. core.) The two conductors twisted together result in a cross-section of the VR cable as shown in FIG. 3B.

Figure 4A:
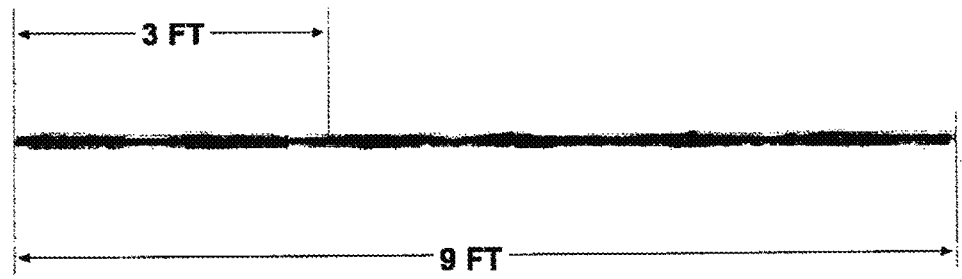
FIG. 4A shows a 3 ft. lay length VR cable.
Figure 4B:
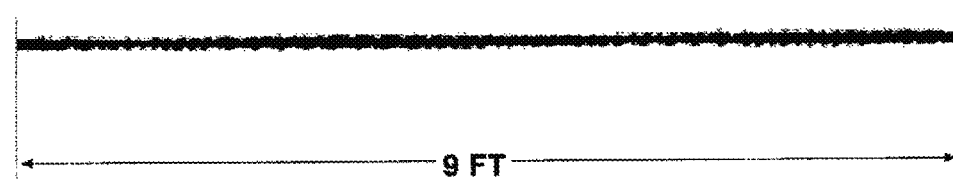
FIG. 4B shows a 9 ft. lay length VR cable.
Figure 4C:
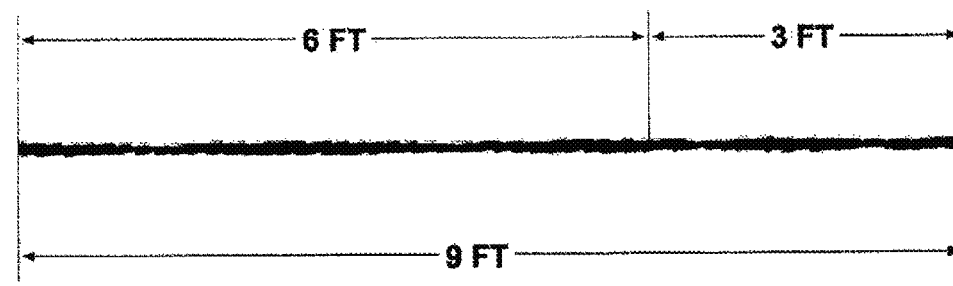
FIG. 4C shows a combination 6 ft. and 3 ft. lay length VR cable.
Figure 5A:
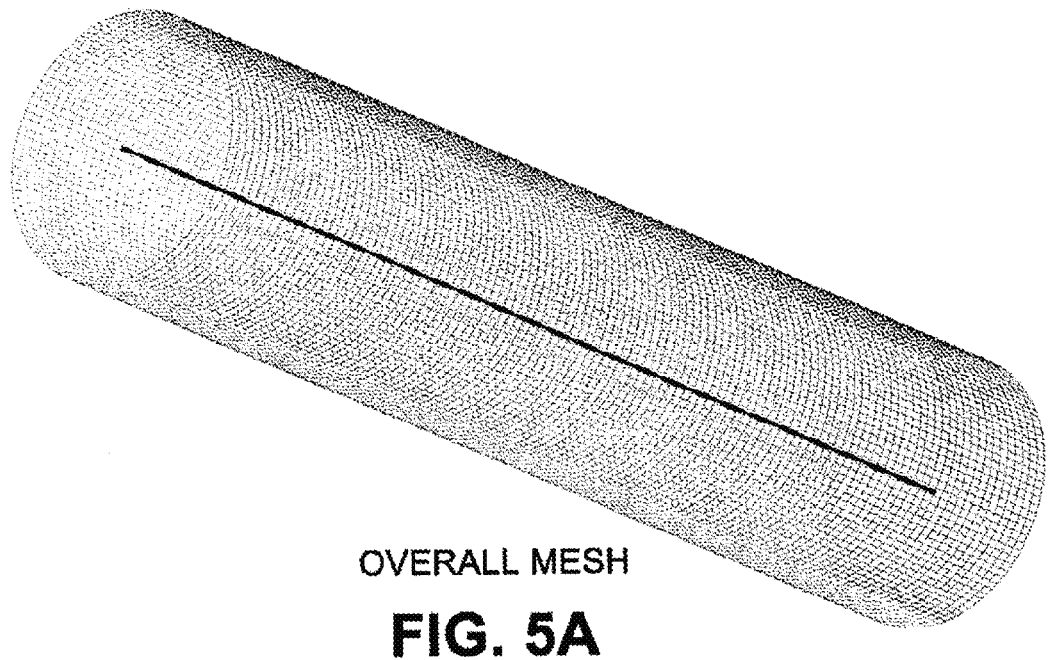
FIG. 5A shows an overall mesh.
Figure 5B:
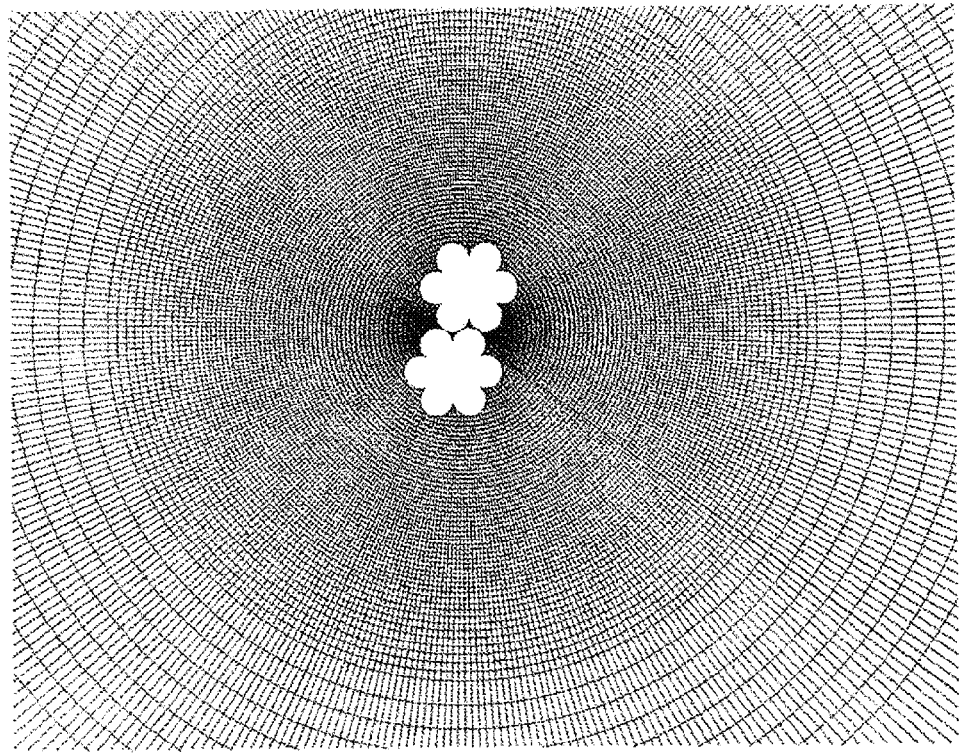
FIG. 5B shows a close-up VR cable and mesh.

FIGS. 4A through 5B illustrate the VR cable's geometry. A three-dimensional 9 ft. section is analyzed with respect to FIGS. 5A through 28. FIG. 4A shows a 3 ft. lay length, FIG. 4B shows a 9 ft. lay length, and FIG. 4C shows a combination 6 ft. and 3 ft. lay length. FIGS. 5A and 5B show a model depicting a mesh. FIG. 5A shows an overall mesh and FIG. 5B shows a close-up cable and mesh. In the flow model of the VR cable, a three-dimensional 9 ft. section is analyzed. FIG. 6A is a key for the directions. FIG. 6B shows the directions of the simulated unsteady flow behavior of air at 25 mph over the VR cable.

Figure 7:
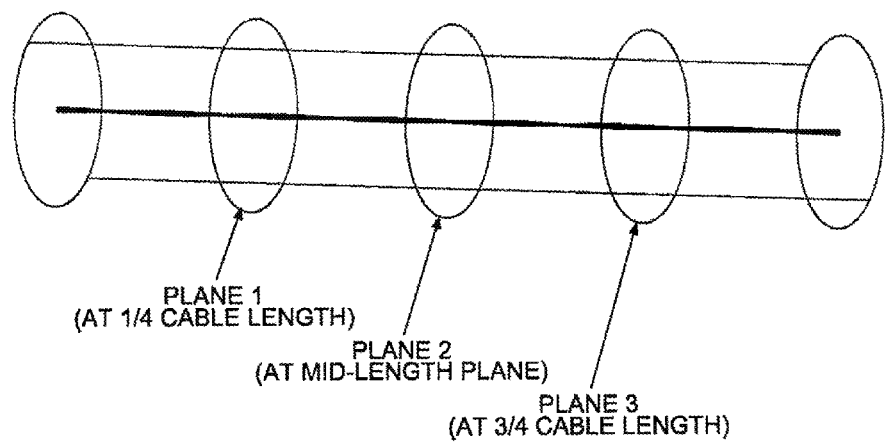
FIG. 7 shows the VR lay configuration plane locations.
Figure 8A:
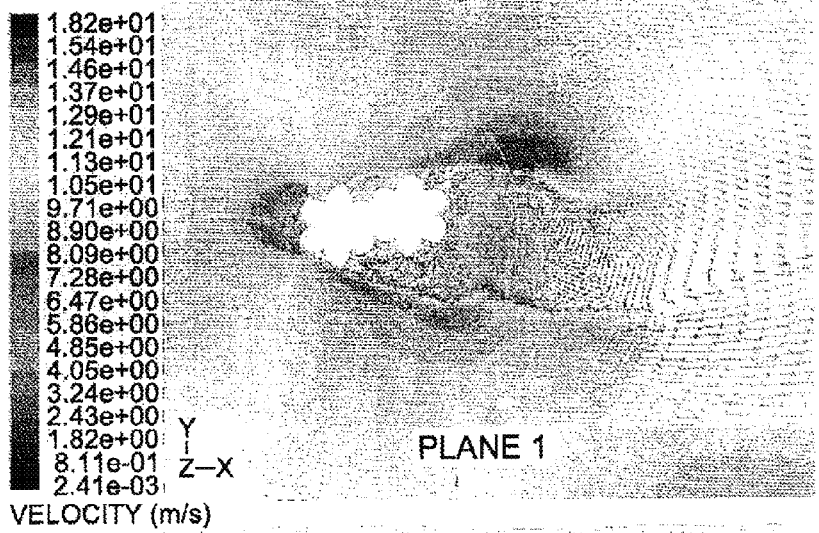
FIGS. 8A, 8B, and 8C show flow velocity of the 3 ft. lay VR cable at plane 1, plane 2, and plane 3 respectively.
Figure 8B:
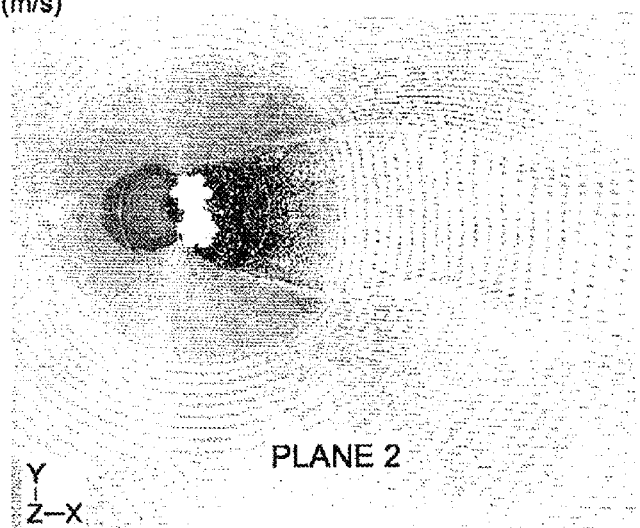
Figure 8C:
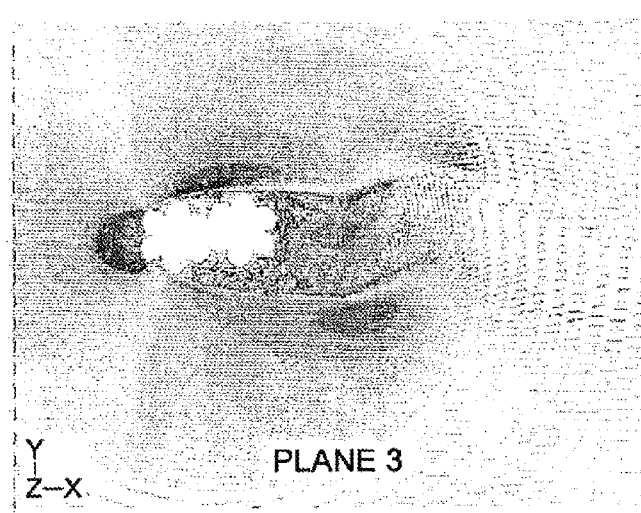
Figure 9A:
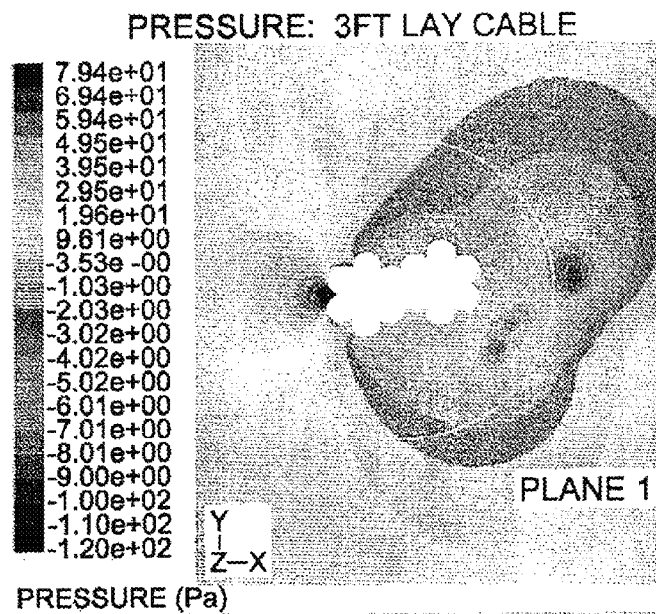
FIGS. 9A, 9B, and 9C show pressure of the 3 ft. lay VR cable at plane 1, plane 2, and plane 3 respectively.
Figure 9B:
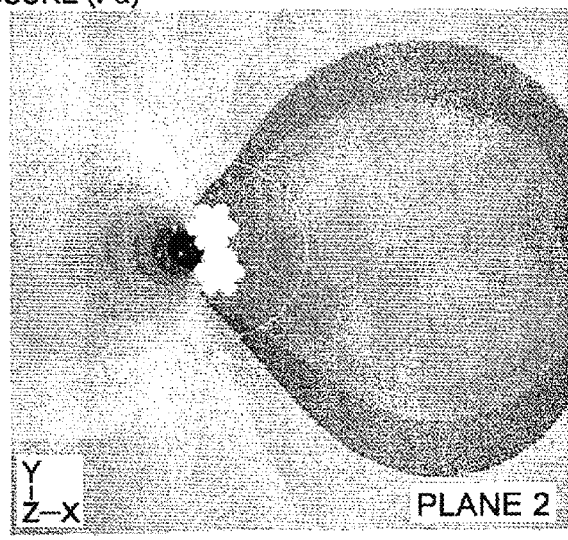
Figure 9C:
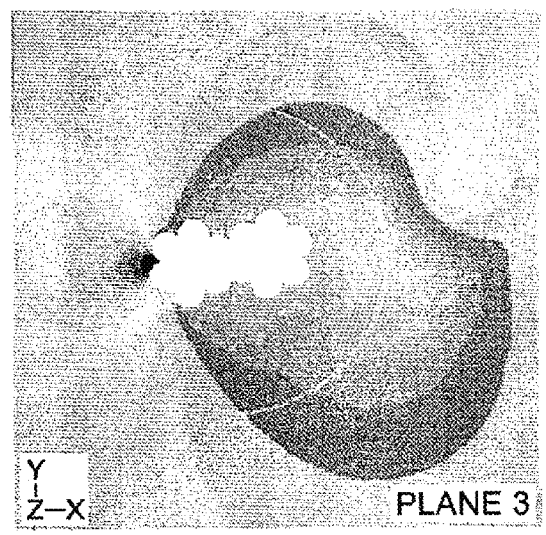
Figure 10A:
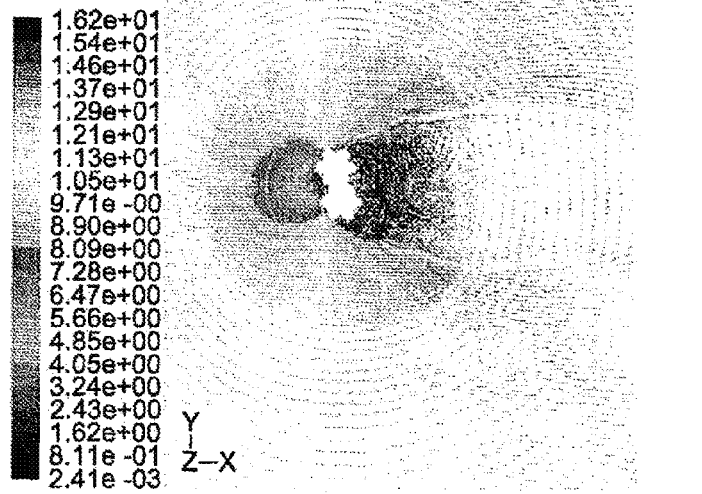
FIGS. 10A, 10B, and 10C show flow velocity at various times of the 3 ft. lay VR cable at plane 2.
Figure 10B:
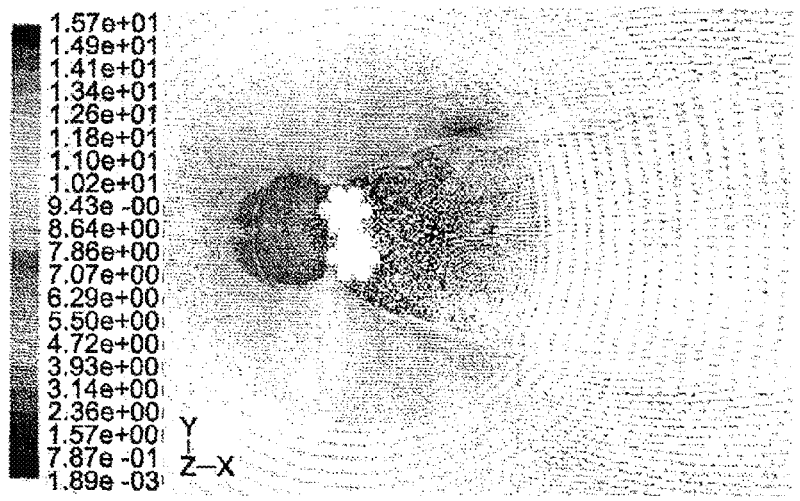
Figure 10C:
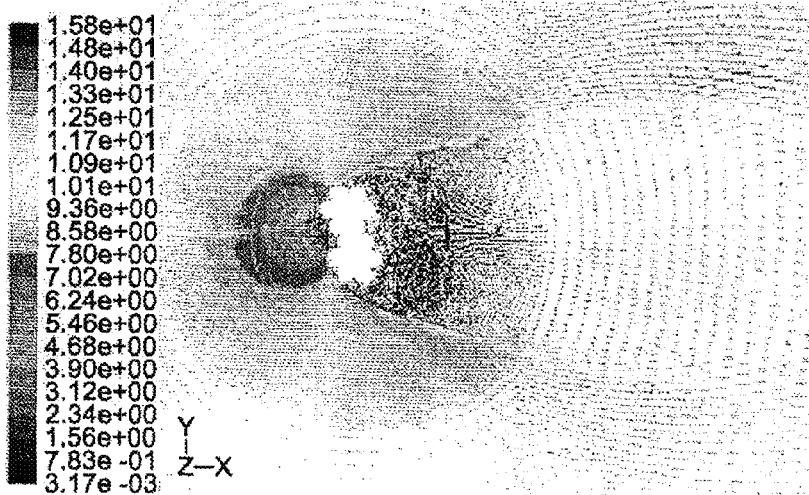
Figure 11A:
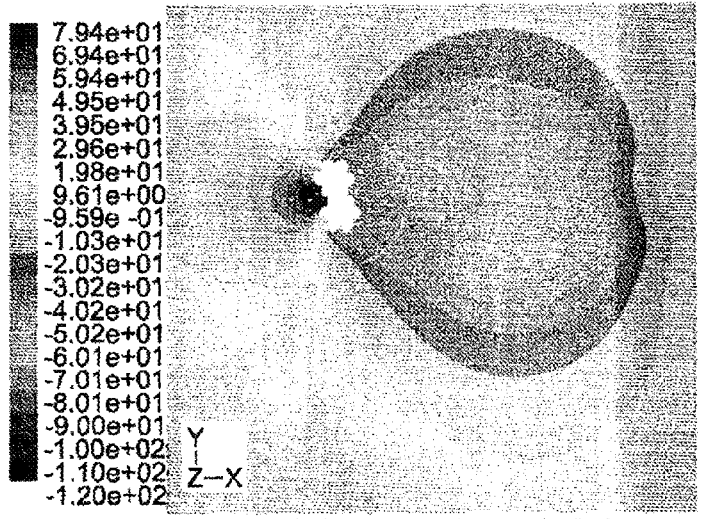
FIGS. 11A, 11B, and 11C show flow pressure at various times of the 3 ft. lay VR cable at plane 2.
Figure 11B:
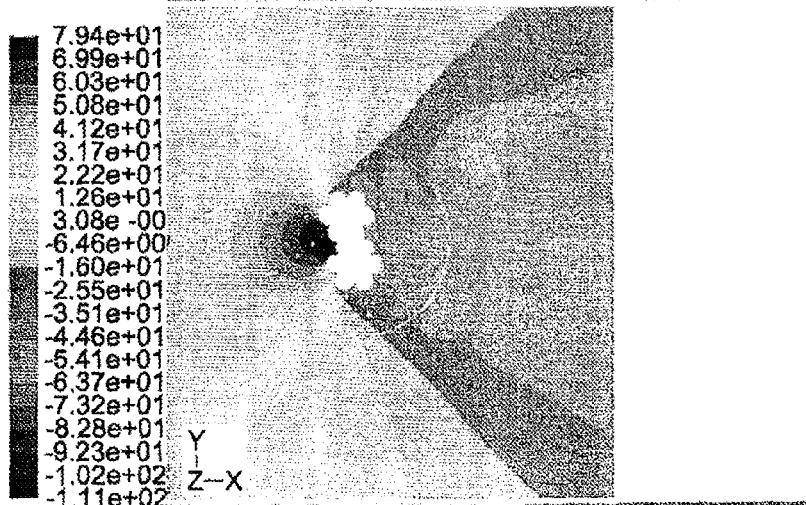
Figure 11C:
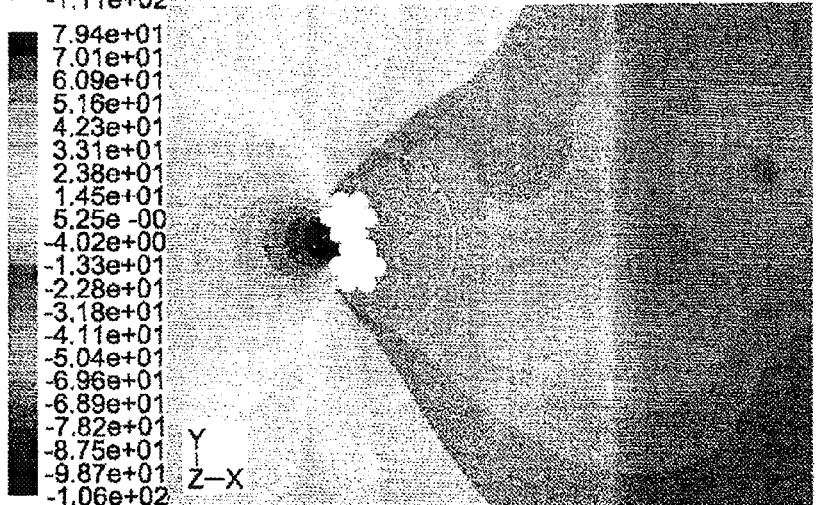
Figure 12A:
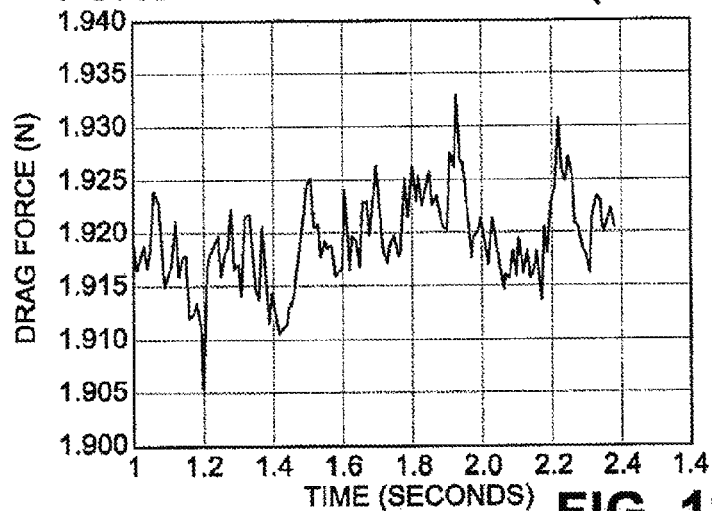
FIGS. 12A, 12B, and 12C show forces on the 3 ft. lay VR cable at plane 1, plane 2, and plane 3 respectively.
Figure 12B:
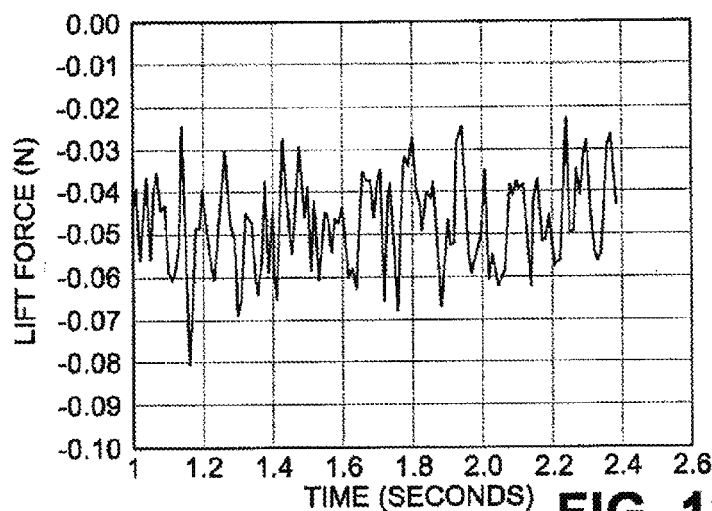
Figure 12C:
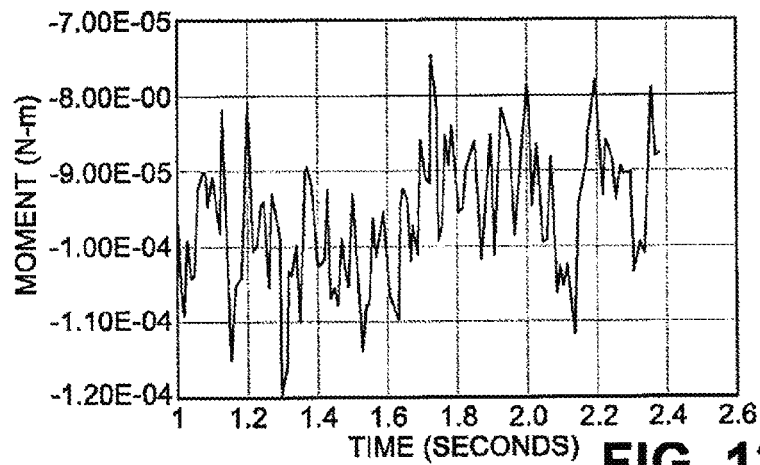

Flow behavior may be analyzed by examining the behavior on planes (e.g. plane 1, plane 2, plane 2) of the VR lay configuration (geometry) of FIG. 4A as shown in FIG. 7. FIGS. 8A, 8B, and 8C show flow velocity of the 3 ft. lay VR cable at plane 1, plane 2, and plane 3 respectively. FIGS. 9A, 9B, and 9C show pressure of the 3 ft. lay VR cable at plane 1, plane 2, and plane 3 respectively. FIGS. 10A, 10B, and 10C show flow velocity at various times of the 3 ft. lay VR cable at plane 2. Velocity (m/s) on plane 2, as shown in FIGS. 10A, 10B, and 10C, at various time-instants indicates the time-dependent (e.g. chaotic) nature of flow behavior. FIGS. 11A, 11B, and 11C show flow pressure at various times of the 3 ft. lay VR cable at plane 2. Pressure (Pa) on plane 2 at various time-instants indicates, as shown in FIGS. 11A, 11B, and 11C, the time-dependent nature of flow behavior. FIGS. 12A, 12B, and 12C show forces on the 3 ft. lay VR cable at plane 1, plane 2, and plane 3 respectively. To summarize the drag and lift of the VR lay configuration (geometry) of FIG. 4A (e.g. the 3 ft. lay), CFD computed an average drag force on the 9 ft. cable (3 ft. lay), for example, is 1.92 N. The CFD computed movement and lift force on the 9 ft. cable (3 ft. lay), for example, are negligible.

Figure 13A:
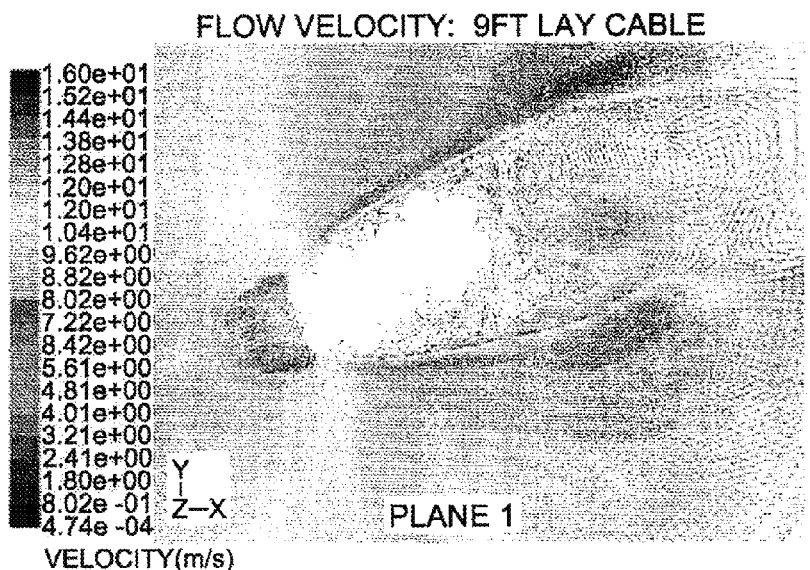
FIGS. 13A, 13B, and 13C show flow velocity of the 9 ft. lay VR cable at plane 1, plane 2, and plane 3 respectively.
Figure 13B:
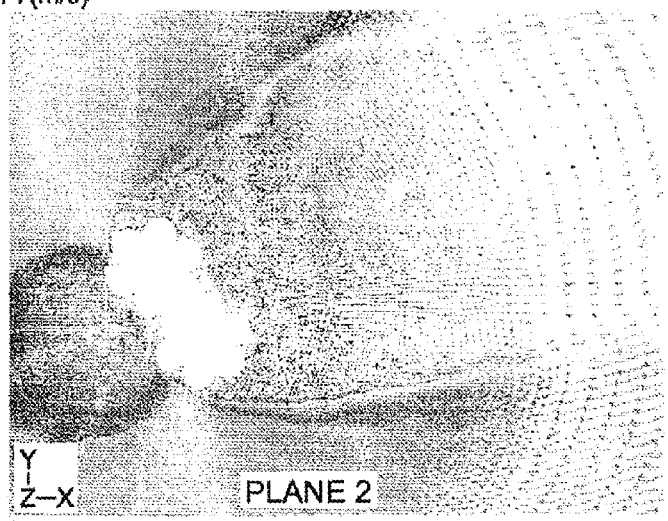
Figure 13C:
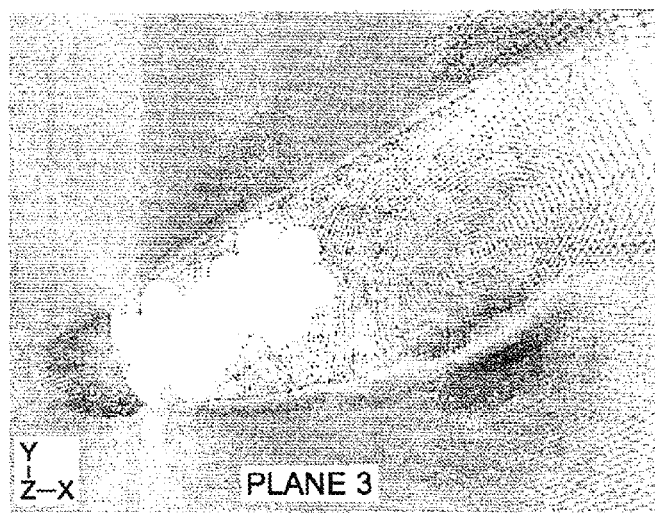
Figure 14A:
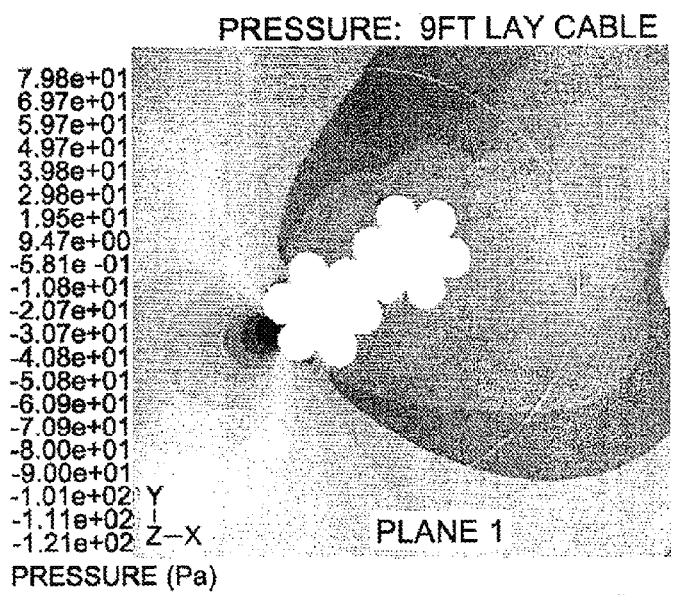
FIGS. 14A, 14B, and 14C show pressure of the 9 ft. lay VR cable at plane 1, plane 2, and plane 3 respectively.
Figure 14B:
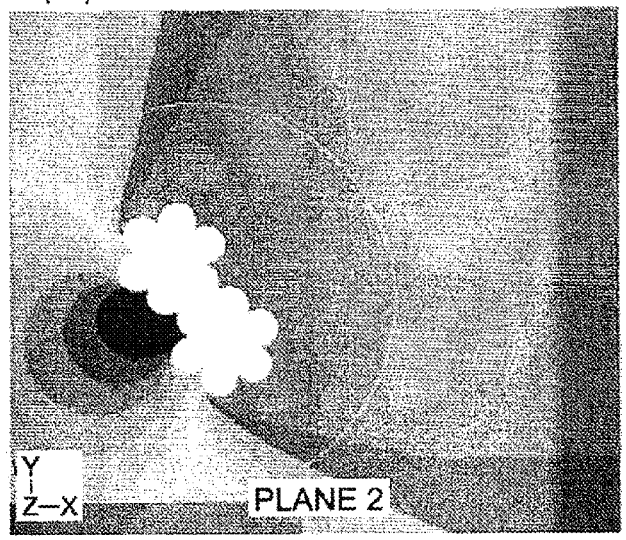
Figure 14C:
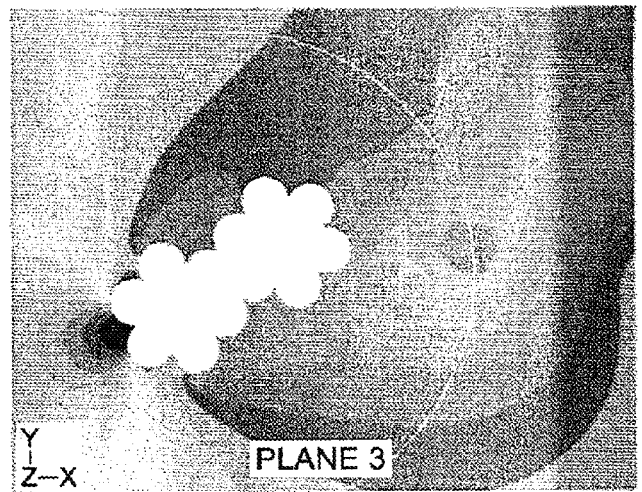
Figure 15A:
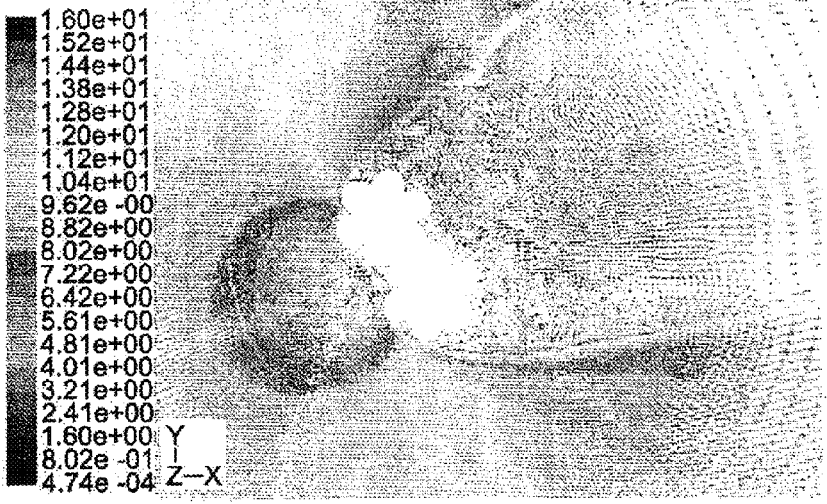
FIGS. 15A, 15B, and 15C show flow velocity at various times of the 9 ft. lay VR cable at plane 2.
Figure 15B:
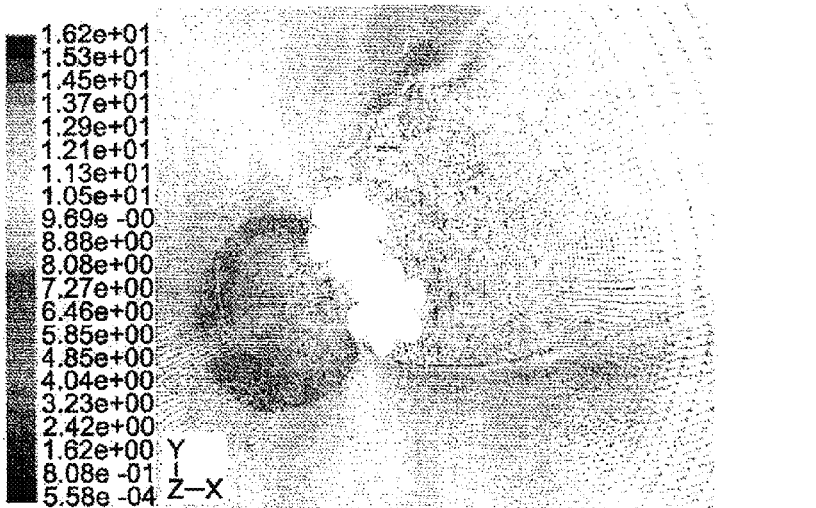
Figure 15C:
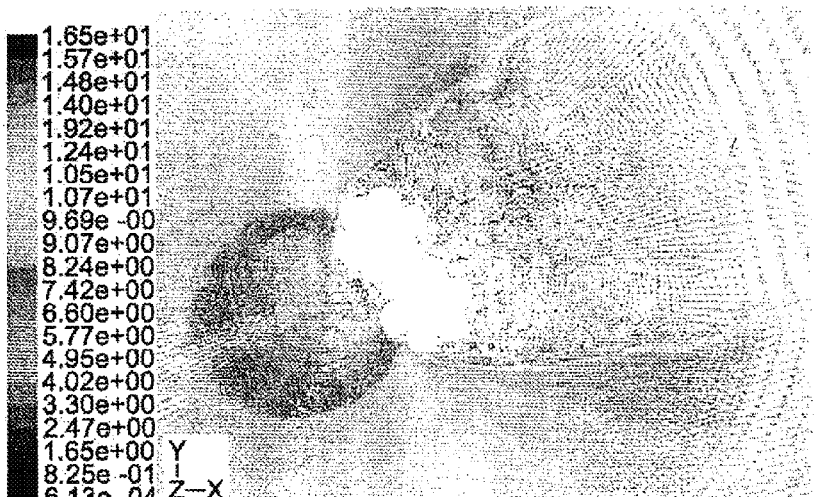
Figure 16A:
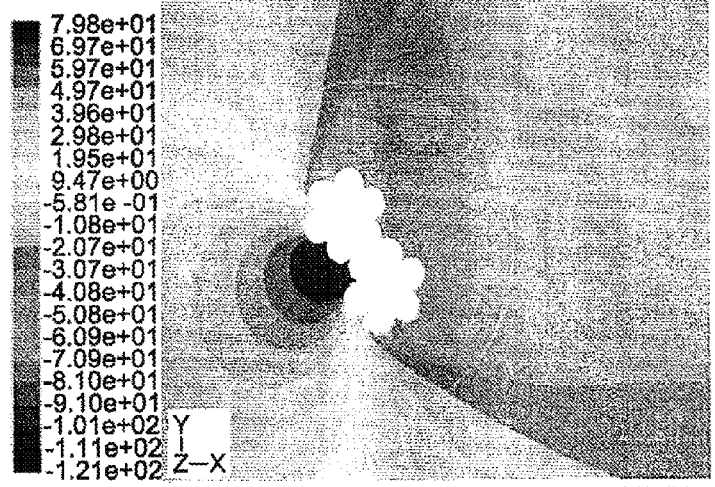
FIGS. 16A, 16B, and 16C show flow pressure at various times of the 9 ft. lay VR cable at plane 2.
Figure 16B:
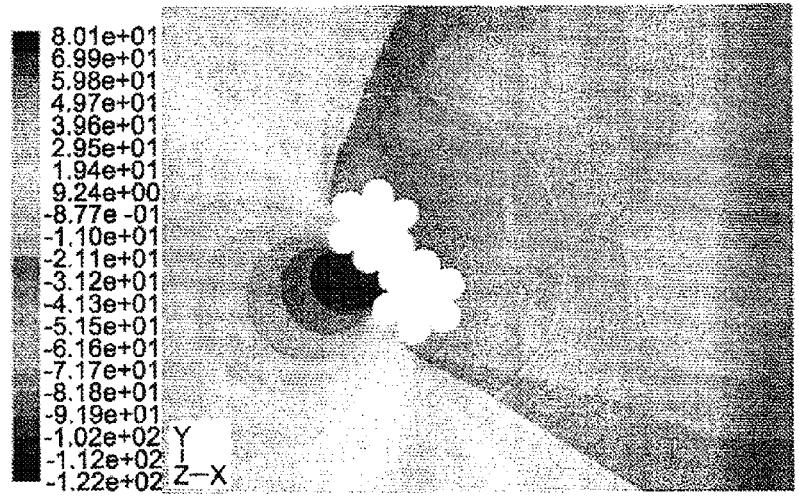
Figure 16C:
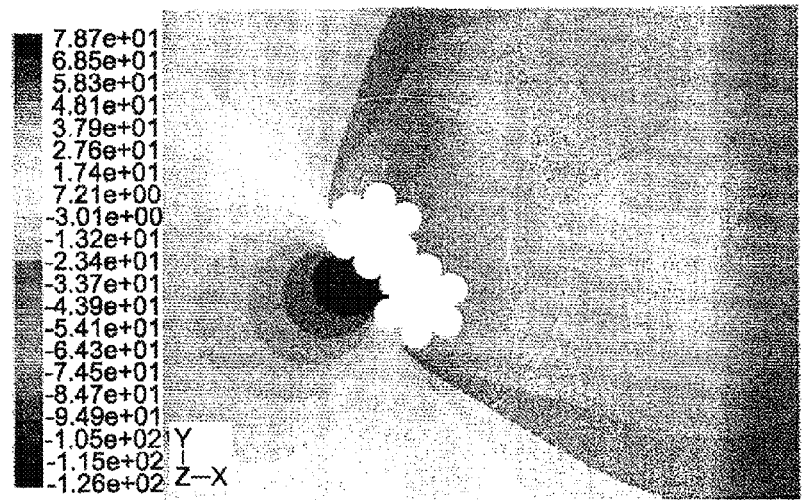
Figure 17A:
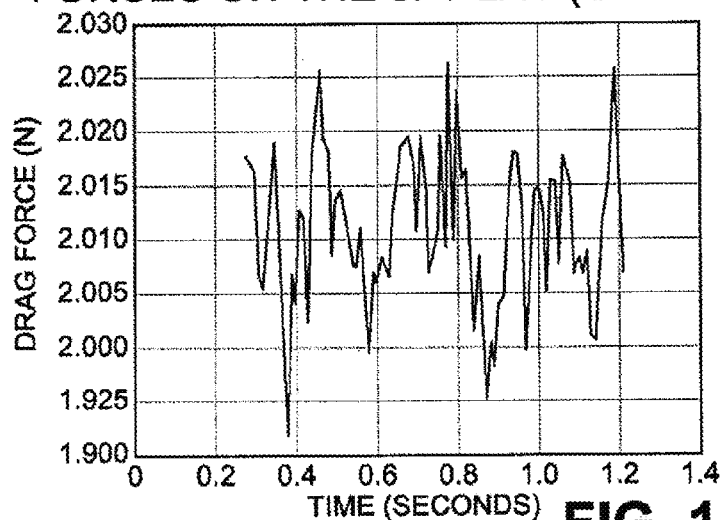
FIGS. 17A, 17B, and 17C show forces on the 9 ft. lay VR cable at plane 1, plane 2, and plane 3 respectively.
Figure 17B:
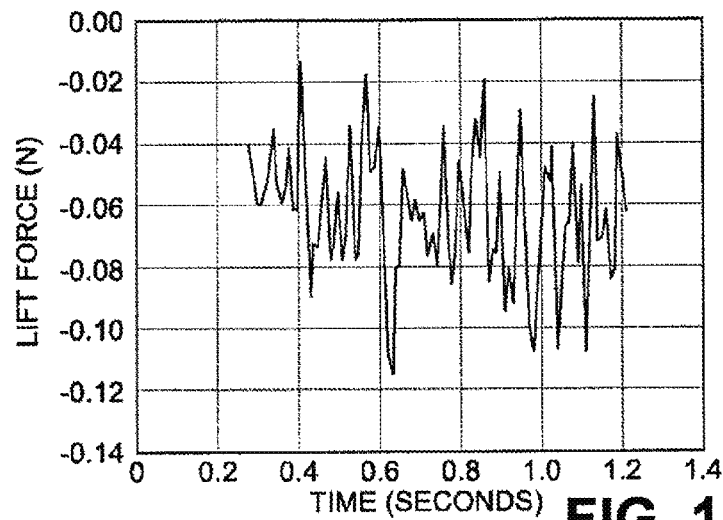
Figure 17C:
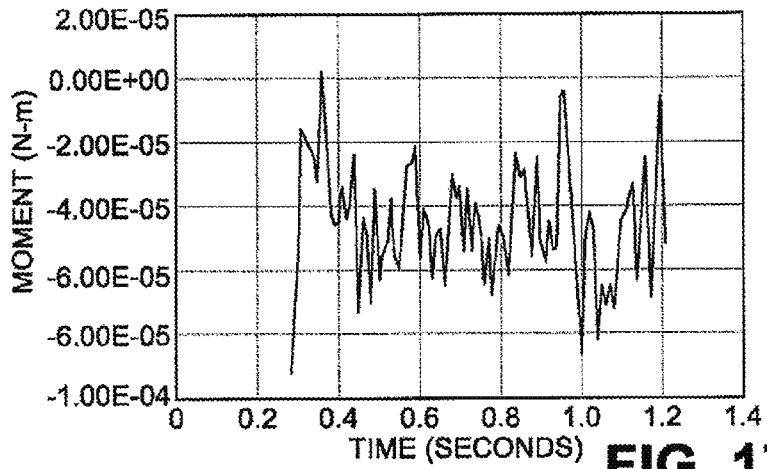

Flow behavior may be analyzed by examining the behavior on planes (e.g. plane 1, plane 2, plane 2) of the VR lay configuration (geometry) of FIG. 4B as shown in FIG. 7. FIGS. 13A, 13B, and 13C show flow velocity of the 9 ft. lay VR cable at plane 1, plane 2, and plane 3 respectively. FIGS. 14A, 14B, and 14C show pressure of the 9 ft. lay VR cable at plane 1, plane 2, and plane 3 respectively. FIGS. 15A, 15B, and 15C show flow velocity at various times of the 9 ft. lay VR cable at plane 2. Velocity (m/s) on plane 2, as shown in FIGS. 15A, 15B, and 15C, at various time-instants indicates the time-dependent (e.g. chaotic) nature of flow behavior. FIGS. 16A, 16B, and 16C show flow pressure at various times of the 9 ft. lay VR cable at plane 2. Pressure (Pa) on plane 2 at various time-instants indicates, as shown in FIGS. 16A, 16B, and 16C, the time-dependent nature of flow behavior. FIGS. 17A, 17B, and 17C show forces on the 9 ft. lay VR cable at plane 1, plane 2, and plane 3 respectively. To summarize the drag and lift of the VR lay configuration (geometry) of FIG. 4B (e.g. the 9 ft. lay), CFD computed an average drag force on the 9 ft. cable (9 ft. lay), for example, is 2.011 N. The CFD computed movement and lift force on the 9 ft. cable (9 ft. lay), for example, are negligible.

Figure 18A:
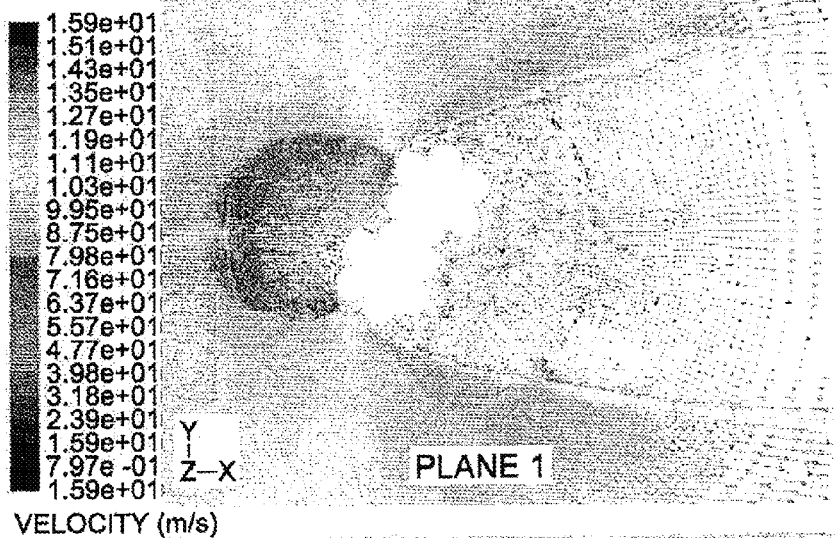
FIGS. 18A, 18B, and 18C show flow velocity of the 6 ft.-3 ft. combination lay VR cable at plane 1, plane 2, and plane 3 respectively.
Figure 18B:
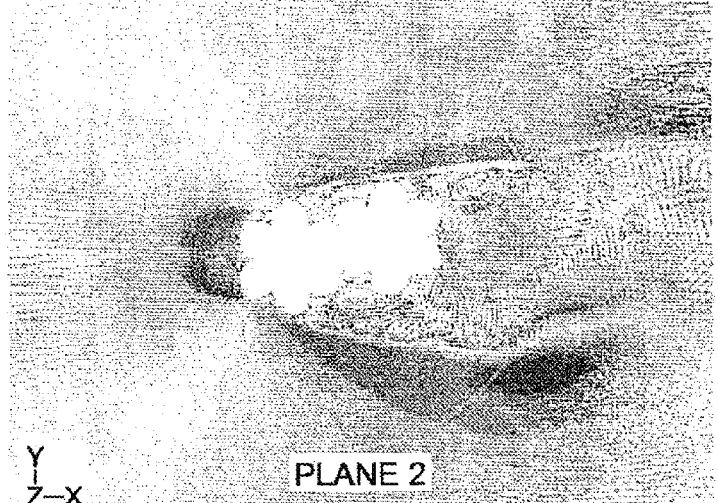
Figure 18C:
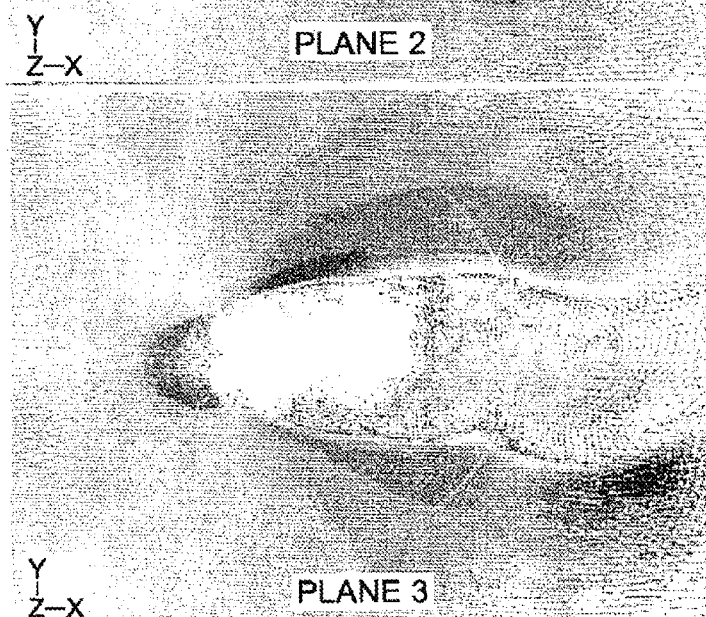
Figure 19A:
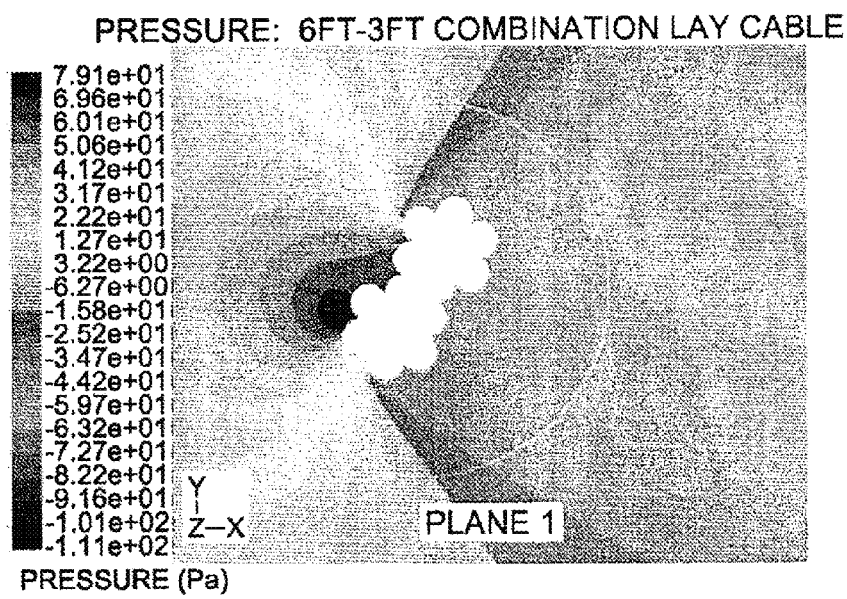
FIGS. 19A, 19B, and 19C show pressure of the 6 ft.-3 ft. combination lay VR cable at plane 1, plane 2, and plane 3 respectively.
Figure 19B:
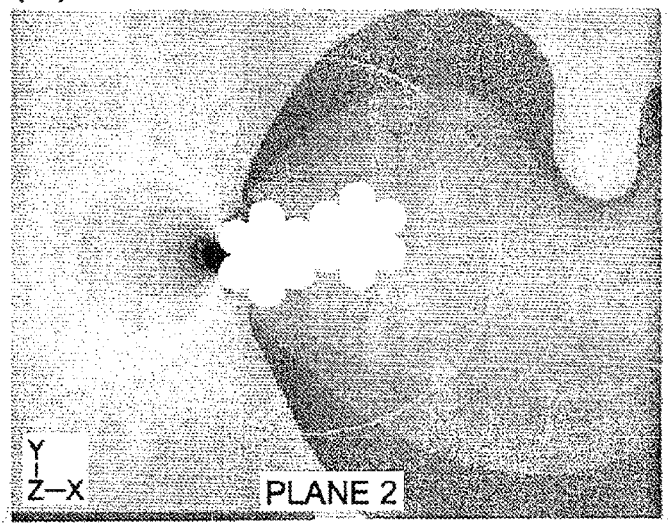
Figure 19C:
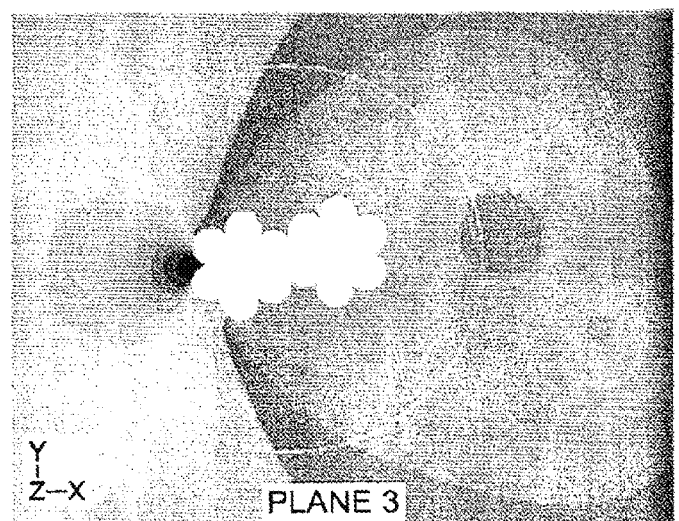
Figure 20A:
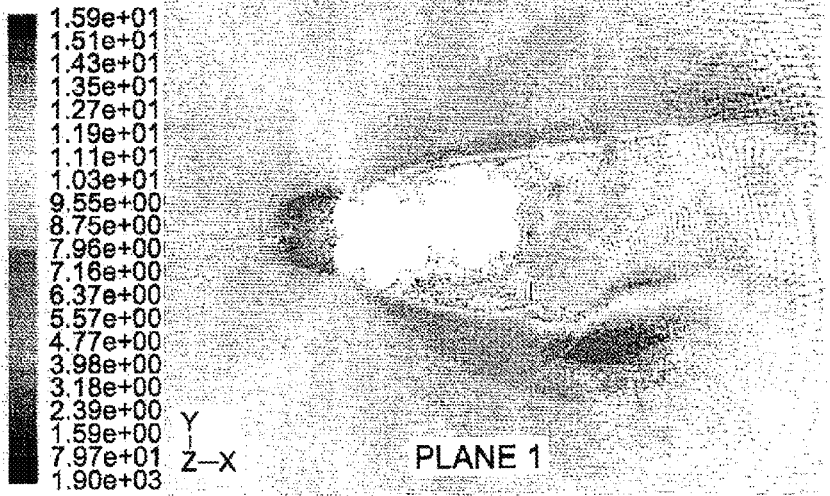
FIGS. 20A, 20B, and 20C show flow velocity at various times of the 6 ft.-3 ft. combination lay VR cable at plane 2.
Figure 20B:
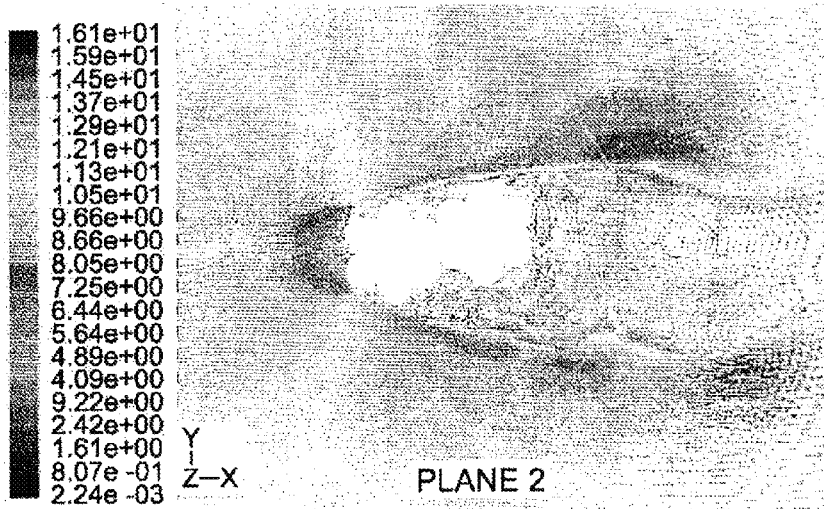
Figure 20C:
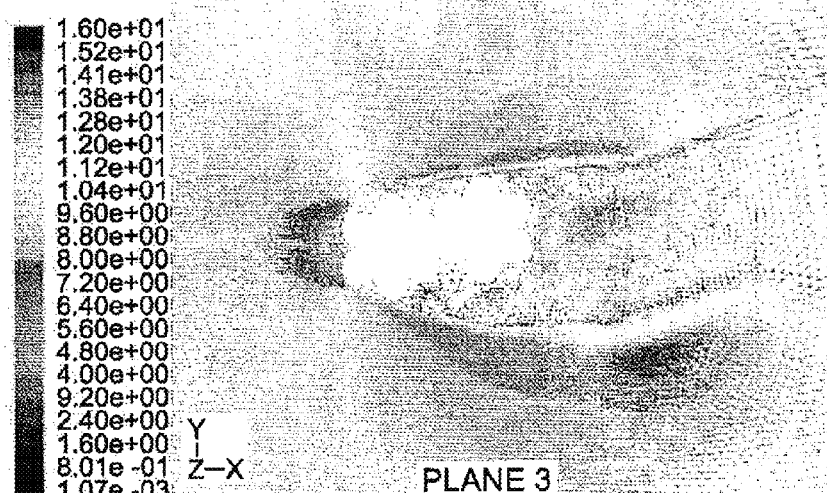
Figures 21A, 21B, 21C:
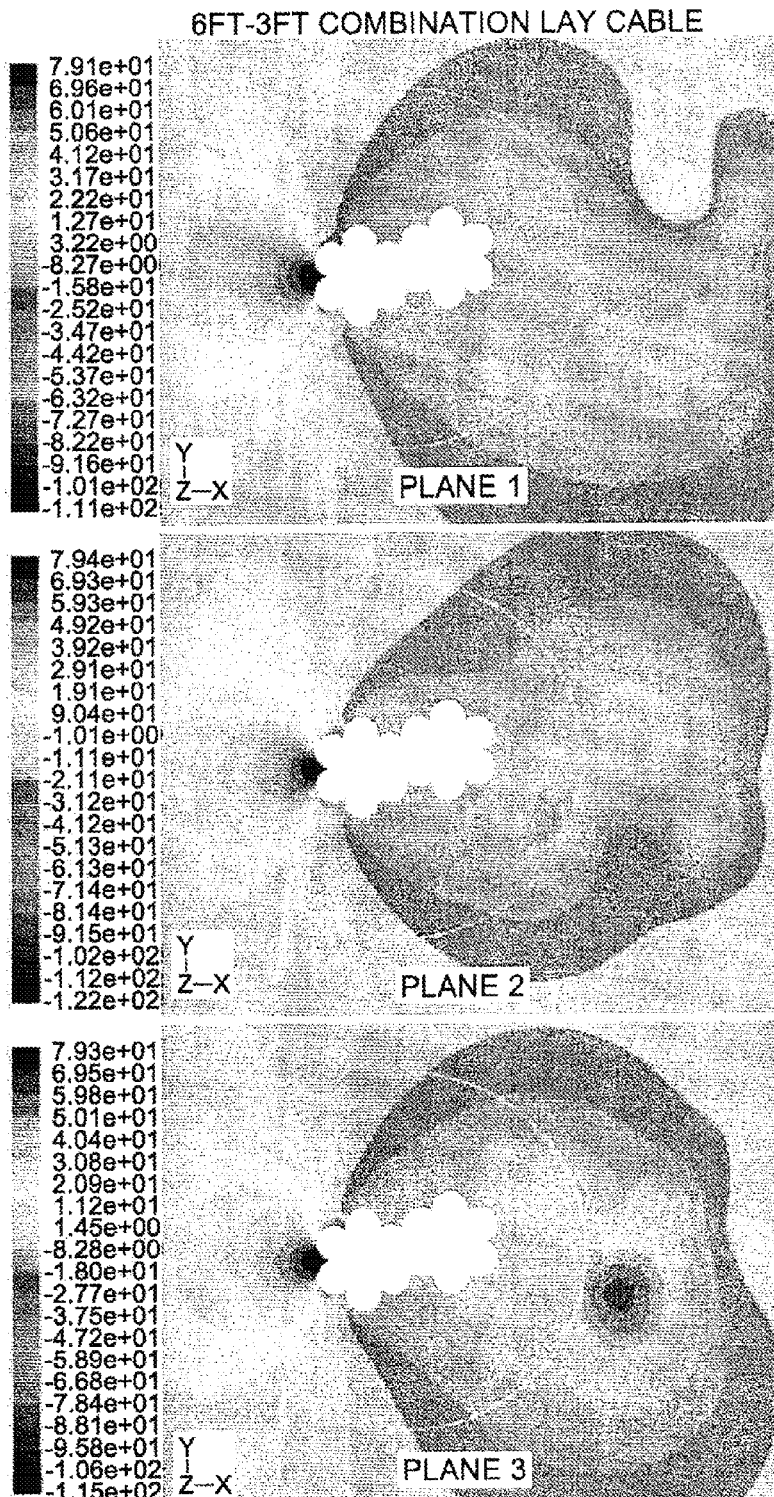
FIGS. 21A, 21B, and 21C show flow pressure at various times of the 6 ft.-3 ft. combination lay VR cable at plane 2.
Figure 22A:
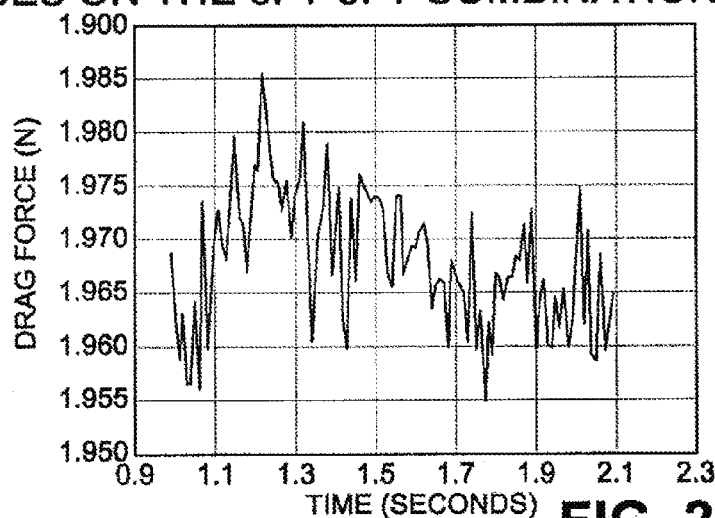
FIGS. 22A, 22B, and 22C show forces on the 6 ft.-3 ft. combination lay VR cable at plane 1, plane 2, and plane 3 respectively.
Figure 22B:
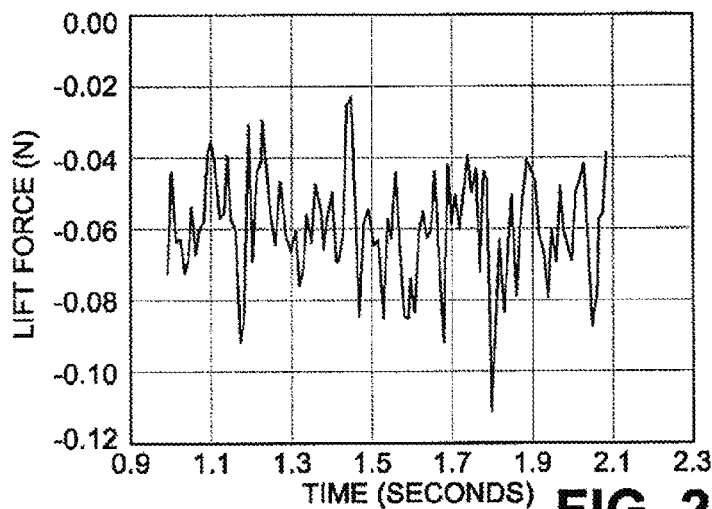
Figure 22C:
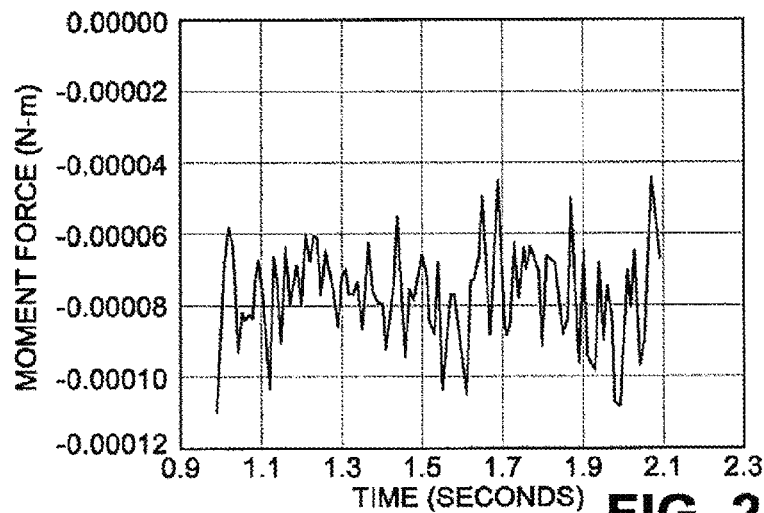

Flow behavior may be analyzed by examining the behavior on planes (e.g. plane 1, plane 2, plane 2) of the VR lay configuration (geometry) of FIG. 4C as shown in FIG. 7. FIGS. 18A, 18B, and 18C show flow velocity of the 6 ft.-3 ft. combination lay VR cable at plane 1, plane 2, and plane 3 respectively. FIGS. 19A, 19B, and 19C show pressure of the 6 ft.-3 ft. combination lay VR cable at plane 1, plane 2, and plane 3 respectively. FIGS. 20A, 20B, and 20C show flow velocity at various times of the 6 ft.-3 ft. combination lay VR cable at plane 2. Velocity (m/s) on plane 2, as shown in FIGS. 20A, 20B, and 20C, at various time-instants indicates the time-dependent (e.g. chaotic) nature of flow behavior. FIGS. 21A, 21B, and 12C show flow pressure at various times of the 6 ft.-3 ft. combination lay VR cable at plane 2. Pressure (Pa) on plane 2 at various time-instants indicates, as shown in FIGS. 21A, 21B, and 21C, the time-dependent nature of flow behavior. FIGS. 22A, 22B, and 22C show forces on the 6 ft.-3 ft. combination lay VR cable at plane 1, plane 2, and plane 3 respectively. To summarize the drag and lift of the VR lay configuration (geometry) of FIG. 4C (e.g. the 6 ft.-3 ft. combination lay), CFD computed an average drag force on the 9 ft. cable (6 ft.-3 ft. combination lay), for example, is 1.968 N. The CFD computed movement and lift force on the 9 ft. cable (6 ft.-3 ft. combination lay), for example, are negligible.

TABLE 3 below summarizes the above analysis on the VR cable consistent with embodiments of the invention. As indicated in TABLE 3, the analysis indicates that the lifting force and torsional moment on the VR cable may be negligible. The lay length may be no affect on this force and the moment. The lay length may have an effect on the drag force over the VR cable. A general trend where the drag force decreases with a decrease in lay length may be observed.

TABLE 3

| Cable Layout | Force (N) over 9 ft section of cable | Comments |
| --- | --- | --- |
| 3 ft. lay cable | 1.91 | Lowest force of all cables analyzed |
| 6 ft. and 3 ft. combination lay | 1.97 | |
| 9 ft. lay cable | 2.01 | Highest force of all 3 lay lengths |

A distinct vortex shedding frequency may not observed for the VR cable as the angle of attack of the cable cross-section continuously changes along the length of the VR cable. The forces computed using a 2d analysis compare reasonably with the 3d predictions. The drag force predicted using 3d simulations is lower than that predicted using 2d simulations. As described below, the mechanism that leads to a reduction in the drag over the VR cable is explored by examining the details of the flow behavior over the cable.

Figure 24:
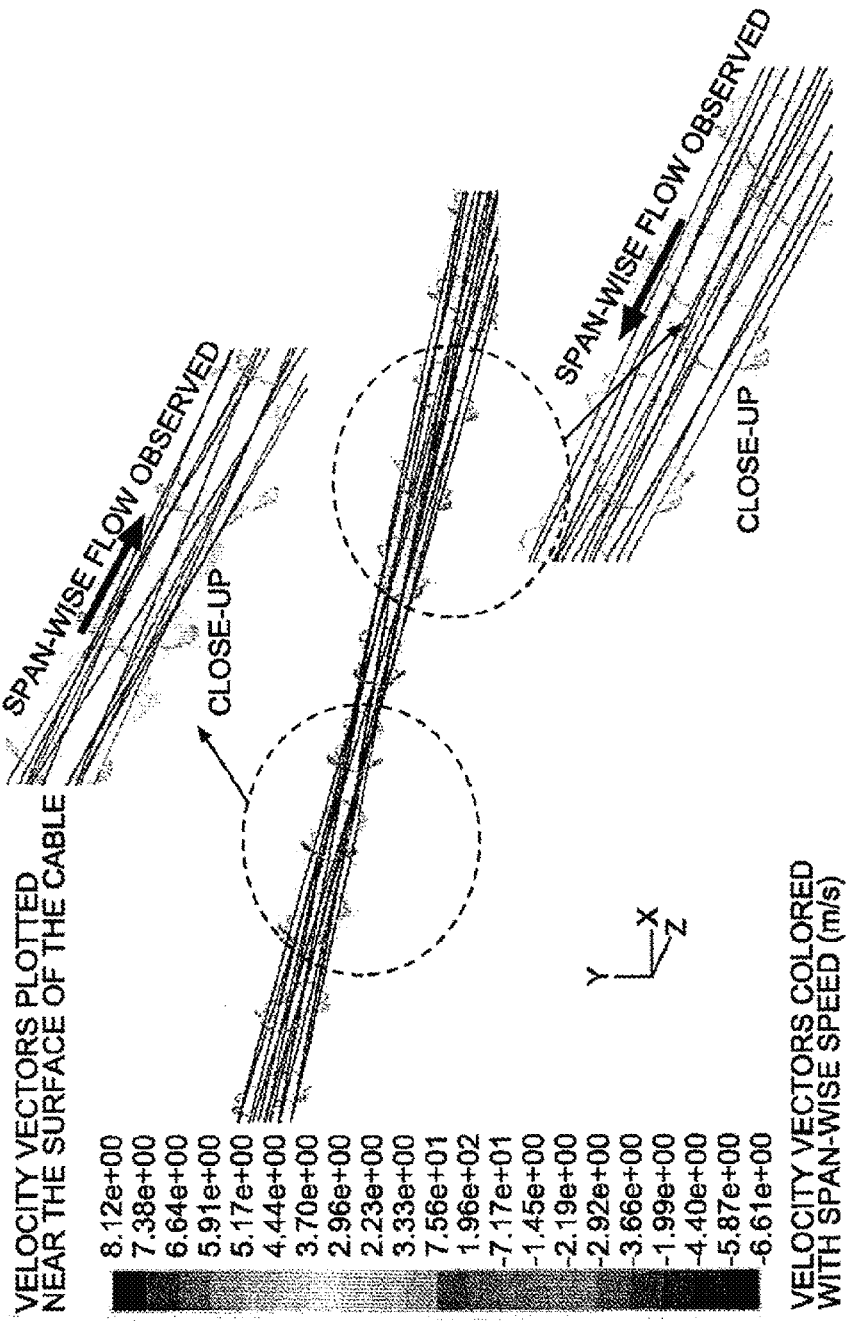
FIG. 24 shows the detailed examination for a 3 ft. lay VR cable (e.g.

FIGS. 23 and 24 show an examination of detailed flow behavior. FIG. 23 shows the detailed examination for the 9 ft. lay VR cable (e.g. FIG. 4B) and FIG. 24 shows the detailed examination for a 3 ft. lay VR cable (e.g. FIG. 4A.) In FIGS. 23 and 24, span-wise flow is observed, which may lead to a reduction in the drag force.

Figure 25:
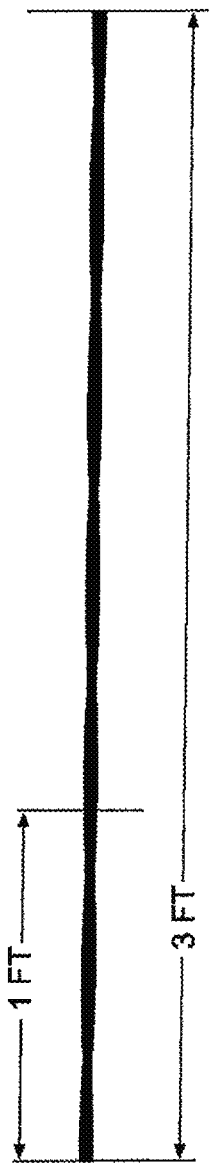
FIG. 25 illustrates a 3 ft. long section of a 1 ft. lay VR cable.
Figure 26A:
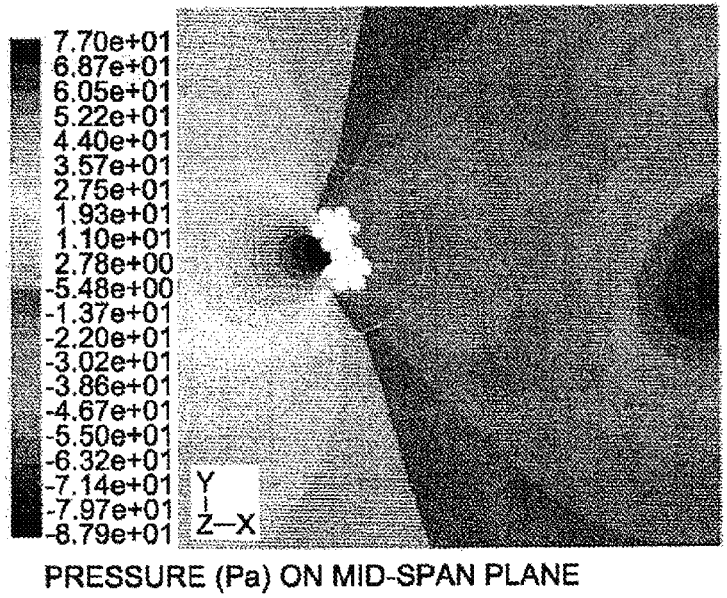
FIG. 26A shows flow pressure at a time of the 1 ft. lay VR cable at mid span plane.
Figure 26B:
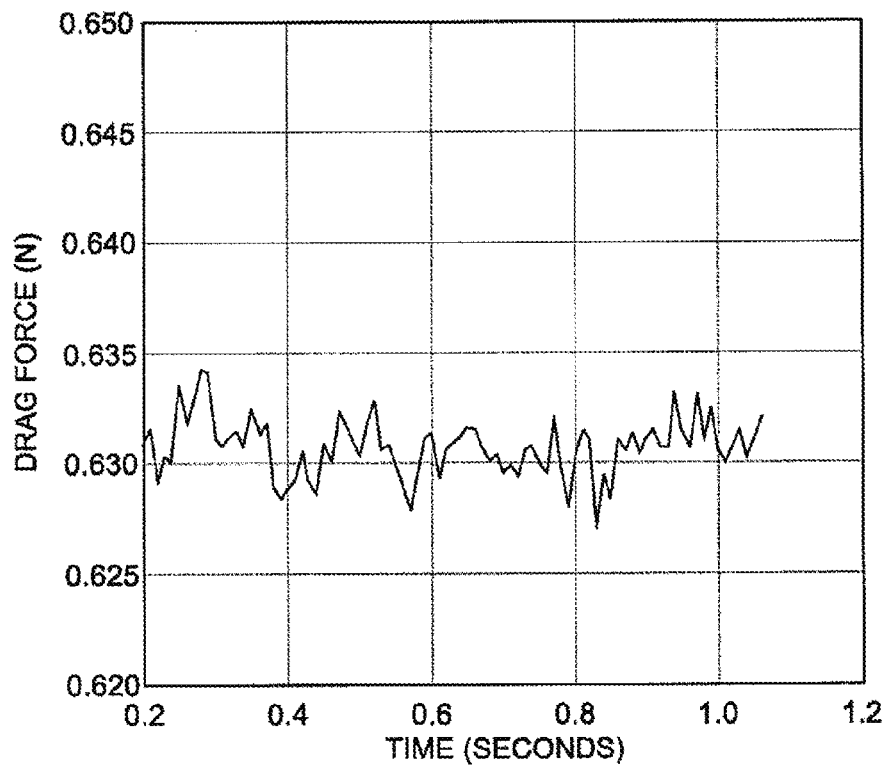
FIG. 26B is a corresponding force plot with respect to time.
Figure 27A:
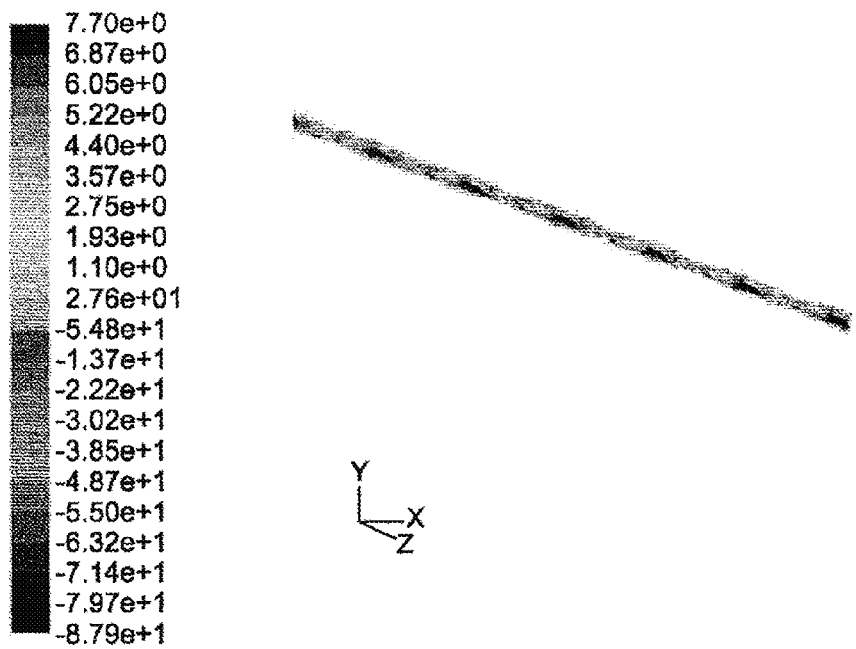
FIG. 27A shows velocity vectors plotted near the surface of the 3 ft. lay VR cable.
Figure 27B:
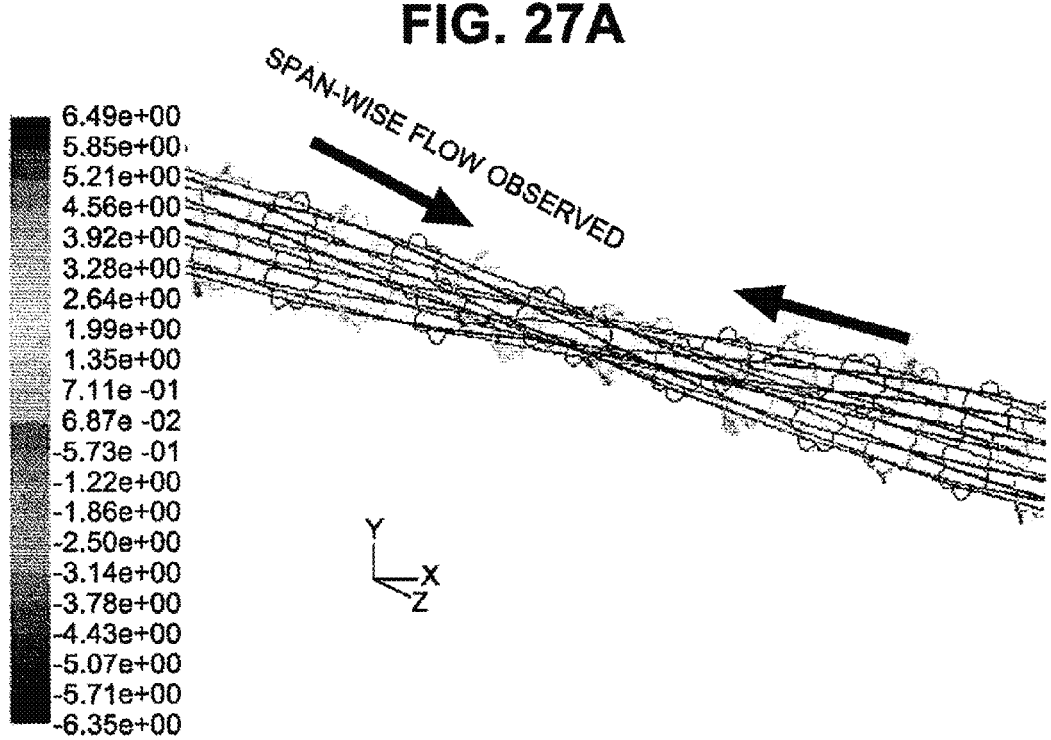
FIG. 27B shows velocity vectors with span-wise speed.

Next, an examination of a detailed flow behavior for a 1 ft. lay VR cable will be shown. FIG. 25 illustrates a 3 ft. long section of a 1 ft. lay VR cable. To gain greater confidence in the trends observed using 3 ft., 9 ft., and 3 ft.-6 ft. lay, a 1 ft. lay length cable is investigated. It is anticipated that a 1 ft. lay length cable will show more dramatic results as compared to the other lay lengths. FIG. 26A shows flow pressure at a times of the 1 ft. lay VR cable at mid span plane. FIG. 26B is a corresponding force plot with respect to time. According to the examination, the drag force on the 3 ft. section of 1 ft. lay length cable is 0.63N; this force is scaled to obtain the drag force on a 9 ft. cable. The force on a 9 ft. long, 1 ft. lay length cable is (3*.63) 1.89N. The lift force and moment on the cable are negligible. FIGS. 27A and 27B show the examination of detailed flow behavior for a 3 ft. lay VR cable. FIG. 27A shows velocity vectors plotted near the surface of the 3 ft. lay VR cable. FIG. 27B shows velocity vectors with span-wise speed.

As shown in TABLE 4 below, the CFD analysis predicts that the lifting force and torsional moment on the VR cable may be negligible. The lay length may have no affect on the lift force and the moment. The lay length may have an effect on the drag force over the VR cable. A trend where the drag force decreases with a decrease in lay length may be observed as shown in TABLE 4.

TABLE 4

| Cable Layout | Force (N) over 9 ft section of cable | Comments |
| --- | --- | --- |
| 1 ft. lay cable | 1.89 | Lowest force of all cables analyzed (6% reduction in drag as compared to 9 ft. lay cable) |
| 3 ft. lay cable | 1.91 | 5% reduction in drag as compared to 9 ft. lay cable |
| 6 ft. and 3 ft. combination lay | 1.97 | 2% reduction in drag as compared to 9 ft. lay cable |
| 9 ft. lay cable | 2.01 | Highest force of all 4 lay lengths |

Figure 28:
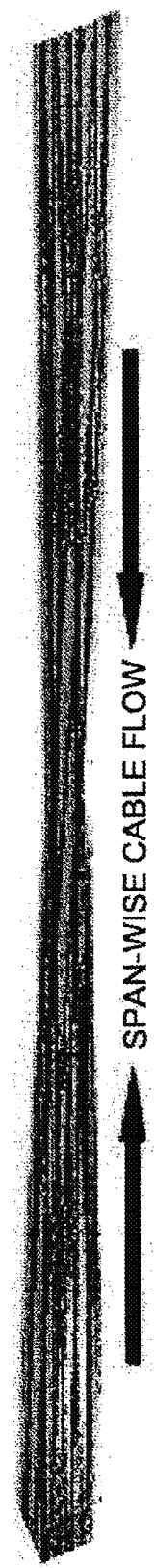
FIG. 28 shows the span-wise flow directed towards the cross-section that subtends the smallest area to the incoming flow.

Drag reduction over aerodynamic bodies may not easily achieved. A drag reduction of even 1-2% for aerodynamic shapes may be considered good. A decrease in the net force acting on the VR cable may be observed with a decrease in lay length. A reduction in the net force on the VR cable and no change in the moment may result in a more stable cable. A close examination of the flow behavior may indicate span-wise flow along the VR cable. As illustrated in FIG. 28, the span-wise flow may be directed towards the cross-section that subtends the smallest area to the incoming flow. The span-wise flow for the 1 ft. lay VR cable may be higher than that for the 3 ft. lay VR cable, which is higher than that for the 9 ft. lay VR cable. A trend indicating a decrease in drag with decreased lay length may be observed. A preliminary assessment of the flow behavior may indicate that span-wise flow may be responsible for a reduction in the drag force. This behavior may be similar to that observed for a swept aircraft wing. A backward sweep of the wing induces span-wise flow and a reduction in the drag and lift forces. VR cable lay induces twisting, which in turn may cause a span-wise flow to occur and hence a change in the drag force. Consequently, the above data indicates that the drag force over the VR cable may be reduced by reducing the lay length of the VR cable.

While certain embodiments of the invention have been described, other embodiments may exist. Further, the disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A vibration resistant cable comprising:
    a first conductor having a diameter d; and
    a second conductor having the diameter d, the second conductor twisted around the first conductor at a lay length between 3 feet and 6 feet to eliminate bagging of the vibration resistant cable during installation; wherein:
    the first conductor comprises six first aluminum strands surrounding a first core steel strand, and the second conductor comprises six second aluminum strands surrounding a second steel core strand; and
    the lay length is varying.

2. The vibration resistant cable of claim 1, wherein an optimum lay length is a function of the diameter d.

3. The vibration resistant cable of claim 1, wherein an optimum lay length is determined by the equation, $c_1 d + c_2$, wherein $c_1$ and $c_2$ are constants configured to obtain a locking force to eliminate bagging in the vibration resistant cable and to provide Aeolian vibration dampening in the vibration resistant cable.

4. The vibration resistant cable of claim 1, wherein the diameter d is equal to about 0.281 inches.

5. The vibration resistant cable of claim 1, wherein the first core steel strand has a diameter equal to about 0.0937 inches.

6. The vibration resistant cable of claim 5, wherein the second core steel strand has a diameter equal to about 0.0937 inches.

7. The vibration resistant cable of claim 1, wherein the vibration resistant cable is not under tension in a power line.

8. The vibration resistant cable of claim 1, wherein the lay length is further configured to cause a locking force between the first conductor and the second conductor to reduce relative movement.

9. The vibration resistant cable of claim 1, wherein the lay length is further configured to allow some relative movement between the first conductor and the second conductor to provide Aeolian vibration dampening in the vibration resistant cable.

10. A vibration resistant cable comprising:
a first conductor comprising a plurality of first strands surrounding a first core steel strand; and
a second conductor comprising a plurality of second strands surrounding a second core steel strand, the second conductor twisted around the first conductor at a lay length that is based at least in part on a locking force of the first conductor or the second conductor;
wherein the locking force comprises a compressive spring force based at least in part on a first spring rate associated with the first conductor or a second spring rate associated with the second conductor, the locking force preventing bagging in the first conductor or the second conductor; and
wherein bagging results from a relative movement between the first conductor and the second conductor caused at least in part by sheave pushback during installation of the vibration resistant cable.

11. The vibration resistant cable of claim 10, wherein the plurality of first strands comprises six aluminum strands.

12. The vibration resistant cable of claim 10, wherein the plurality of second strands comprises six aluminum strands.

13. The vibration resistant cable of claim 10, wherein the first conductor and the second conductor have a diameter d that is equal to about 0.281 inches.

14. The vibration resistant cable of claim 10, wherein the first core steel strand has a diameter equal to about 0.0937 inches.

15. The vibration resistant cable of claim 14, wherein the second core steel strand has a diameter equal to about 0.0937 inches.

16. The vibration resistant cable of claim 10, wherein the lay length is 3 feet+/−10%.

17. The vibration resistant cable of claim 10, wherein the vibration resistant cable is not under tension in a power line.

18. The vibration resistant cable of claim 10, wherein the lay length is varying.

* * * * *